(12) United States Patent
Deel et al.

(10) Patent No.: US 8,789,815 B2
(45) Date of Patent: *Jul. 29, 2014

(54) CABLE HOIST AND BRACKET SYSTEM AND METHOD THEREOF

(75) Inventors: Adam Deel, North Olmsted, OH (US); Randy G. Cloud, Mentor, OH (US)

(73) Assignee: Preformed Line Products Company, Mayfield Village, OH (US)

( * ) Notice: Subject to any disclaimer, the term of this patent is extended or adjusted under 35 U.S.C. 154(b) by 732 days.

This patent is subject to a terminal disclaimer.

(21) Appl. No.: 12/888,190

(22) Filed: Sep. 22, 2010

(65) Prior Publication Data

US 2011/0198451 A1    Aug. 18, 2011

Related U.S. Application Data

(63) Continuation-in-part of application No. 12/705,755, filed on Feb. 15, 2010.

(51) Int. Cl.
*B66D 3/04* (2006.01)

(52) U.S. Cl.
USPC .......................................... 254/389; 254/262

(58) Field of Classification Search
USPC ................................................ 254/389, 262
See application file for complete search history.

(56) References Cited

U.S. PATENT DOCUMENTS

| | | | | |
|---|---|---|---|---|
| 2,190,661 A | * | 2/1940 | Hauer | 70/49 |
| 2,553,779 A | * | 5/1951 | McLain et al. | 254/134.3 PA |
| 2,838,279 A | * | 6/1958 | Parkyn | 254/134.3 PA |
| 2,902,257 A | * | 9/1959 | Young | 254/134.3 PA |
| 2,914,139 A | * | 11/1959 | Rose | 188/65.1 |
| 3,572,635 A | * | 3/1971 | Desplats | 254/384 |
| 3,853,304 A | * | 12/1974 | Jackson | 254/394 |
| 3,945,502 A | * | 3/1976 | Diener | 212/179 |
| 3,981,483 A | * | 9/1976 | Rinio | 254/384 |
| 3,987,594 A | * | 10/1976 | Rao et al. | 52/111 |
| 4,454,951 A | * | 6/1984 | Kuehn | 212/89 |
| 4,497,471 A | * | 2/1985 | Longberg et al. | 254/372 |
| 4,557,446 A | * | 12/1985 | Barron | 248/65 |

(Continued)

FOREIGN PATENT DOCUMENTS

GB    2163805 A    3/1986

OTHER PUBLICATIONS

Blaine R. Copenheaver, International Search Report, Jul. 5, 2011, 8 pages, International Searching Authority.

*Primary Examiner* — Emmanuel M Marcelo
*Assistant Examiner* — Michael Gallion
(74) *Attorney, Agent, or Firm* — Kegler Brown Hill & Ritter; James J. Pingor

(57) ABSTRACT

Systems and methods that enable a cable to be easily terminated at an elevated level are provided. The cable can be a strength member having a number of fiber optic storage loops disposed about its length. These loops can be strategically positioned upon a sidewall of a multi-dwelling building such that fiber optic service can be efficiently connected as desired. The systems can include a housing apparatus having a locking cavity where the cable is terminated. The housing includes entry and exit apertures that permit a pulling device such as tape to pass there through. A locking mechanism can be positioned within the housing which engages a dead-end device connected to the cable thereby facilitating termination of the dead-end device at the elevated level after frictional release of a retaining knot. Various mounting bracket assemblies are provided which facilitate mounting on most any surface.

19 Claims, 33 Drawing Sheets

(56) References Cited

U.S. PATENT DOCUMENTS

| | | | |
|---|---|---|---|
| 4,770,491 A * | 9/1988 | Champa et al. | 385/136 |
| 4,907,782 A * | 3/1990 | Hoekstra | 254/134.3 PA |
| 5,237,722 A * | 8/1993 | Ott | 16/428 |
| 6,070,305 A * | 6/2000 | Reynolds | 24/134 R |
| 6,817,595 B1 * | 11/2004 | Jenkins et al. | 254/389 |
| 2005/0079037 A1 * | 4/2005 | Boyd | 414/462 |
| 2006/0133916 A1 * | 6/2006 | Wood | 414/539 |
| 2006/0163412 A1 * | 7/2006 | Szarkowski et al. | 242/384 |
| 2009/0060421 A1 * | 3/2009 | Parikh et al. | 385/71 |

* cited by examiner

CABLE HOIST AND BRACKET SYSTEM AND METHOD THEREOF

CROSS-REFERENCE TO RELATED APPLICATIONS

This application is a Continuation-in-Part of pending U.S. patent application Ser. No. 12/705,755 entitled "CABLE HOIST DEAD-END SYSTEMS AND METHODS" and filed on Feb. 15, 2010. The entirety of the above-noted application is incorporated by reference herein.

BACKGROUND

An optical fiber is a glass or plastic fiber designed to guide light down its length by total internal reflection. Although fibers can be made out of transparent plastic or glass, most often, fibers used in long-distance telecommunications applications are glass, due to a lower optical attenuation. Both multi-mode and single-mode fibers are used in communications, with multi-mode fiber used mostly for short distances and single-mode fiber used for longer distance links. Oftentimes, these fibers are used in communication which permits digital data transmission over longer distances and at higher data rates than electronic communication.

In communication service provider applications, optical fibers are bundled as cables. Because light propagates through the fiber with little attenuation compared to electrical cables, use of fiber optic cables is especially advantageous for long-distance communications. By using optical fiber cables, long distances can be spanned with few repeaters. Additionally, the per-channel light signals propagating in the fiber can be modulated at substantially higher rates than conventional coaxial cables.

Today, optical fibers are becoming more and more common as a medium for networking and telecommunications. For example, television and Internet service providers are using fiber optics to deliver their services to customers in homes, multi-residence buildings and office buildings. Unfortunately, many of these structures are older which makes installation sometimes cumbersome and costly as, many times, optical cables must be fed through a structure's existing plumbing, electrical and heating ducts.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods that enable a cable to be easily terminated at an elevated level. For example, the cable can be a strength member having a number of fiber optic storage loops disposed about its length. It will be understood that these loops can be strategically positioned upon a sidewall of a structure (e.g., multi-dwelling building) such that fiber optic service can be efficiently connected as desired. The innovation can employ a bracketing assembly that mounts a hoist apparatus upon a surface such as a knee wall of a rooftop. Variable and adjustable bracket assemblies are provided to accommodate most any surface mounting scenario.

In an aspect, the system includes a housing having a locking cavity where the cable can be terminated. The housing includes entry and exit apertures that permit a pulling device to pass through, e.g., pulling tape from ground level. A locking mechanism can be positioned within the housing which engages a dead-end device connected to the cable thereby facilitating termination of the dead-end device at the elevated level.

Upon engagement, the dead-end device enables removal of the pulling device from ground level. For example, the pulling device can be a pulling tape or rope. In one aspect, the pulling tape (or rope) can be installed into hoist mechanism by, for example, establishing a knot on one end of the pulling tape, wherein the knot can be secured within the housing of the hoist mechanism. The pulling tape can be threaded or loaded such that a loop terminated by the knot can be threaded through the hoist mechanism. An opposing length of the pulling tape (opposite the knot) can be threaded through the hoist mechanism and dropped to ground level along with a loop. The opposing length can facilitate pulling the looped end to hoist height, thereby locking or engaging a dead-end device into the hoist mechanism. Engagement can be accomplished by way of a locking mechanism such as a free-floating locking pin. The pin can be constructed of galvanized or stainless steel.

In one aspect, the dead-end device can be a helically wound wire device having at least two loops, wherein a pulling mechanism is attached to one of the loops and the other of the loops engages with the locking mechanism. The dual loops facilitate ease of removal of the pulling mechanism from ground level.

In other aspects, the dead-end device is a spring loop wedge cap that includes a plurality of wedge blocks that grip the cable and a spring loop that facilitates engagement with the locking mechanism. The spring loop can include a secondary loop configured for installation by and removal of the pulling mechanism. The spring loop can alternatively employ a crimp loop that is attached to the top of the spring loop and provides a secondary loop configured for installation by and removal of the pulling mechanism.

In still other aspects, the dead-end device can be a tapered wedge cap having a hooking mechanism that facilitates installation by and removal of the pulling mechanism. In this aspect, the locking mechanism can include a plurality of spring clips that compress upon insertion and lock once in position at termination.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
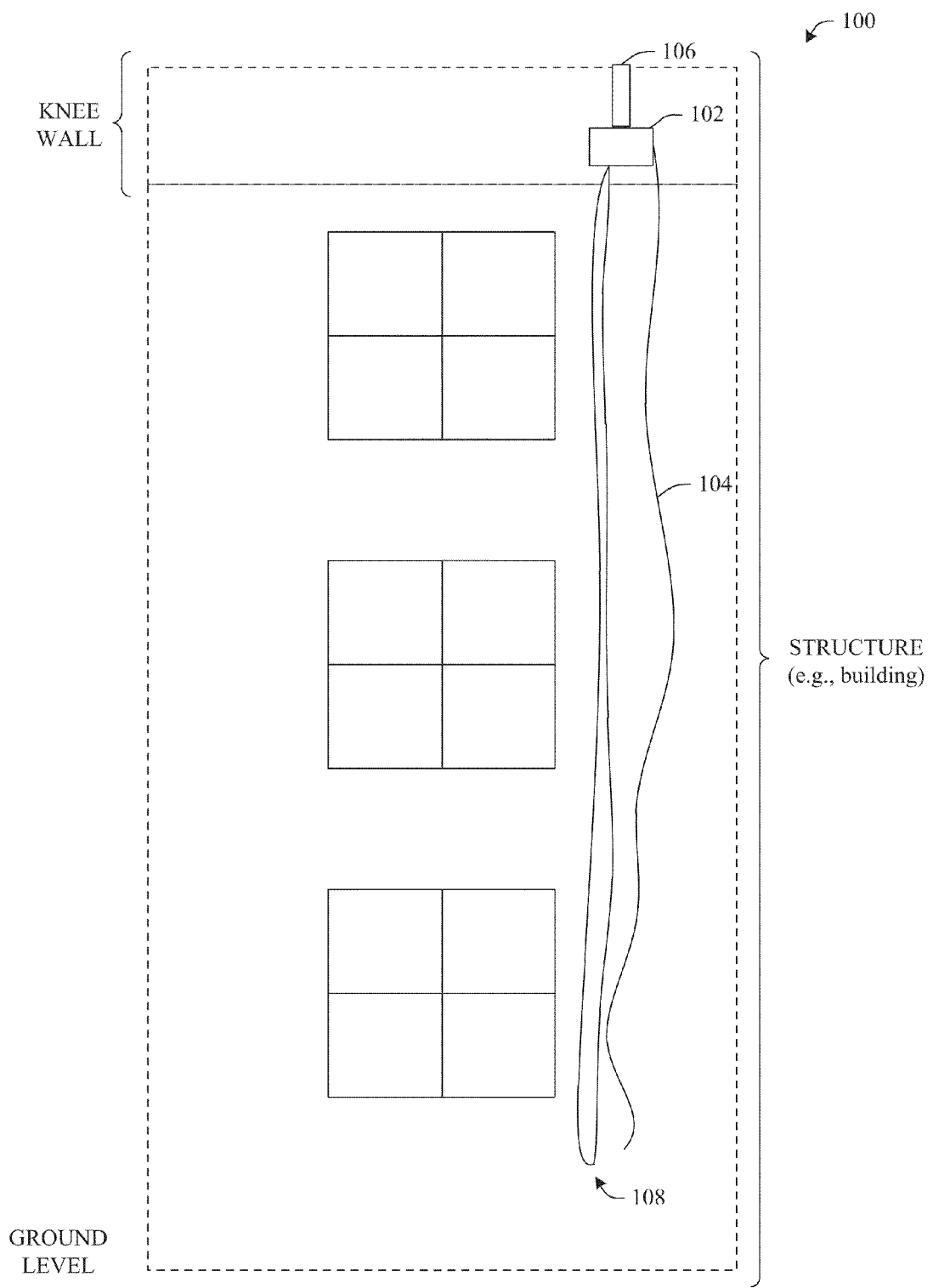
FIG. 1 illustrates an example installation of a fiber hoist device having pulling tape inserted in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

The innovation provides systems and methods of lifting or otherwise hoisting fiber optic cabling to structures such as multi-unit dwelling and office buildings. Additionally, aspects of the innovation disclose bracketing or attachment means by which hosting or lifting mechanisms can be attached. As described above, today, fiber cabling is becoming more and more common for television and other communication and network service providers. While the examples described herein are directed specifically to fiber optic cabling, it is to be understood and appreciated that the features, functions and benefits of the innovation can be applied to most any type of cable, wire, lead, etc. without departing from the spirit and/or scope of the innovation.

Figure 2:
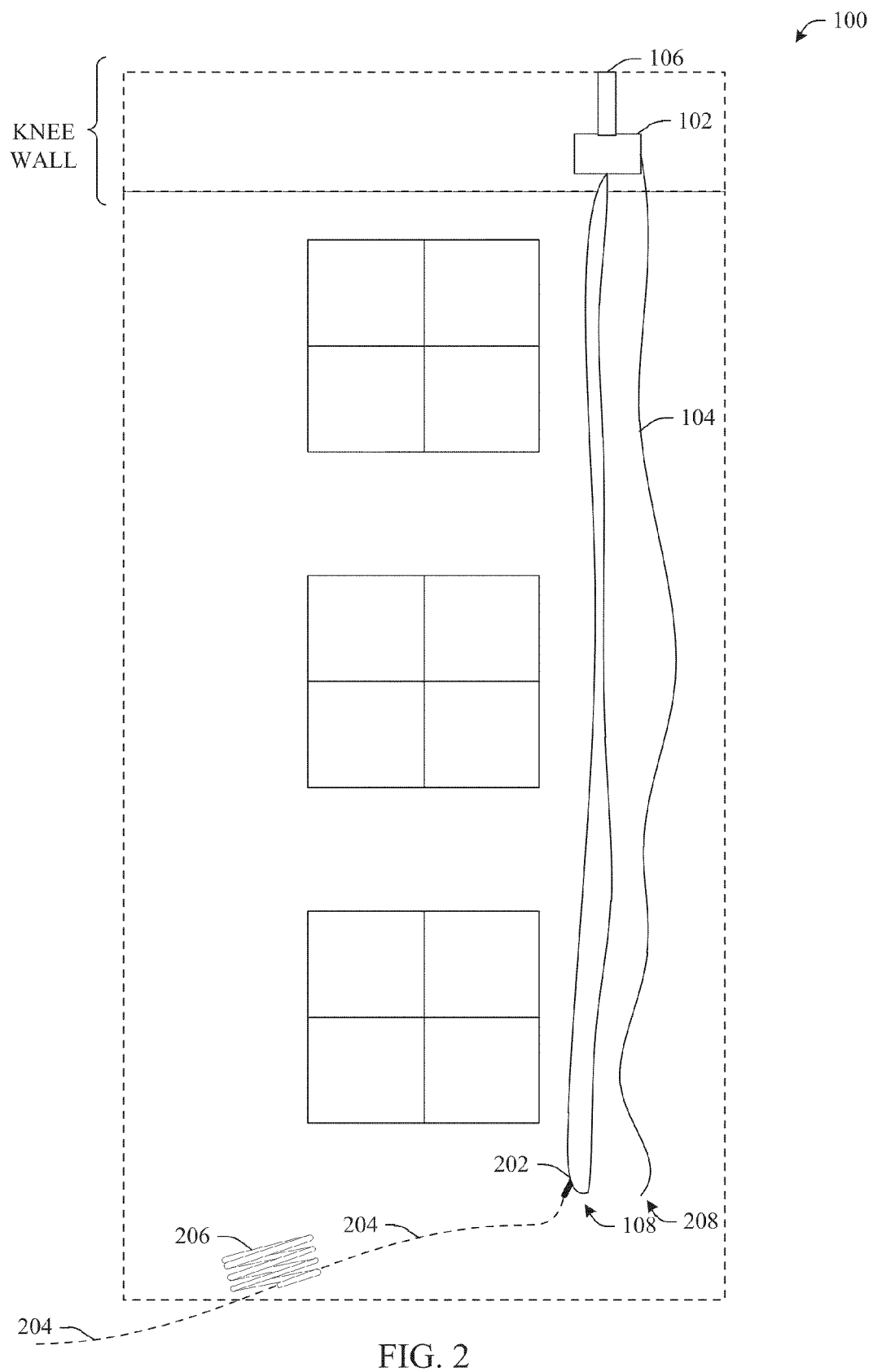
FIG. 2 illustrates an example connection of a strength member to one end of the pulling tape in accordance with an example of the innovation.
Figure 3:
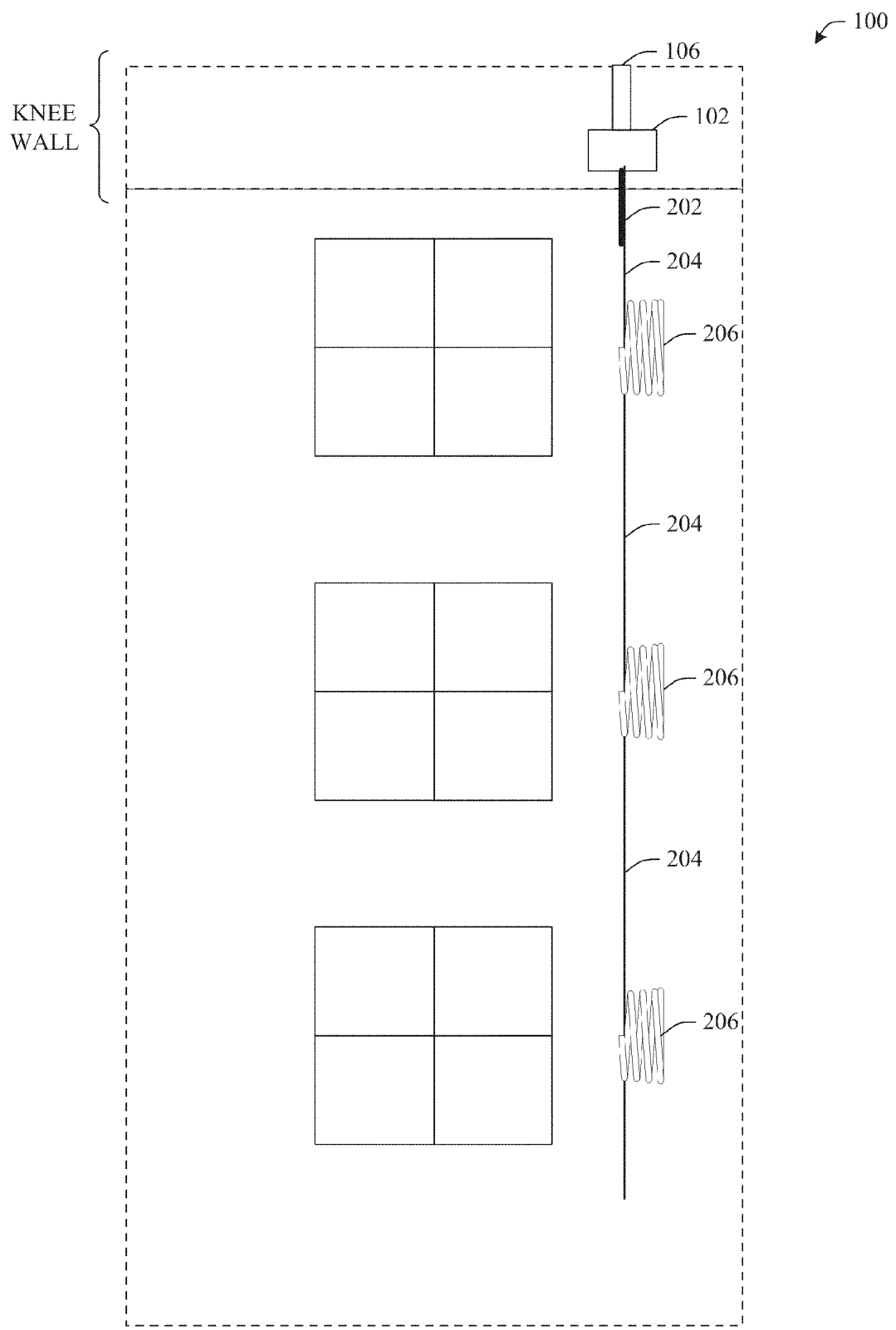
FIG. 3 illustrates an example installation of a fiber hoist assembly and strength member having fiber coils in accordance with aspects of the innovation.

Continuing with the discussion above, conventional installation of fiber optic cabling into existing structures most often required access to air ducts, furnace ducts, plumbing, etc. Unlike conventional approaches, the innovation described and claimed herein facilitates ease of entry into structures from the outside of the structure. More particularly, as shown in FIGS. 1, 2 and 3, the innovation provides techniques by which fiber optic cabling can be effectively lifted or hoisted from ground level to an elevated position of the structure. The cabling that is hoisted can include a coiled portion(s), for example at each floor of the structure. In this way, when fiber optic cabling is desired (e.g., subscription to television or network services), the loop provides cabling outside a wall or window for efficient access. One traditional problem with using these coiled storage locations is that it difficult to lift the strength member along the sidewall of a structure to put in position outside each window. Aspects of the innovation provide an efficient manner by which fiber cabling can be hoisted to a sidewall of a structure.

Referring initially to the drawings, FIG. 1 illustrates an example deployment 100 of the innovation. More particularly, FIG. 1 illustrates a multi-level structure having a knee wall that spans the perimeter of the top. As will be understood, a "knee wall" most often describes a short wall not more than three feet in height that is constructed around the perimeter of a flat top structure or building. One advantage of such a wall is to offer a security ledge upon the roof of the structure.

As shown in the example of FIG. 1, a hoist device 102 can be installed on the outer wall of the knee wall. This hoist device 102, along with a pulling tape or rope 104, can be used to hoist a cable from ground level to the upper portion of the side wall of a structure. In operation, a contractor or craftsman can install the hoist device 102 using a bracketing means 106, thread the pulling tape or rope 104 and drop the same toward ground level as shown. Example bracketing means 106 will be described in accordance with FIGS. 2- to 27 that follow.

The pulling tape or rope 104 can be affixed or otherwise tied off for later use at ground level. For security purposes, it is to be understood that the pulling tape or rope 104 can be tied off above the normal reach of an individual (e.g., 10 or 12 feet above ground level). In addition, as will be described in detail infra, the pulling tape 104 (or rope) can be equipped with a knot that near one end that secures the pulling tape into the hoist device. Once the loop (as shown in FIG. 1) is lifted, the knot can be released thereby enabling the tape to be pulled through the device and removed to ground level.

In order to install cabling, an installer, such as a service provider, can connect a dead-end to the looped end 108 of the pulling tape or rope 104. As shown in FIG. 2, in a fiber optic cabling example, a dead-end or tether 202 can be used to affix strength member 204 having coils of fiber 206 attached thereto. Once affixed to the looped end 108 as illustrated in FIG. 2, the other end 208 (e.g., the un-affixed end) of the pulling tape or rope 104 can be pulled through the hoist device 102 thereby causing the dead-end 202, strength member 204 and coils 206 to rise along the sidewall of the structure. It will be appreciated that the hoist device 102 can be equipped with a pulley (or series of pulleys) or other mechanical treatment that enables the pulling tape or rope 104 to enter and exit a point within (or about) the hoist device 102. In the example described, strategically positioned pathways facilitate direction of the mule tape through the hoist device 102.

FIG. 3 illustrates a hoisted strength member 204 once the pulling tape or rope (104 of FIG. 1) is removed. As will be understood upon a review of the figures that follow, the dead-end 202 can be constructed in such a manner to enable easy removal of the pulling tape or rope once locked. Returning to FIG. 2, once the dead-end 202 is hoisted to the hoist device 102 via the pulling tape or rope, the dead-end 202 locks into the hoist device 102 causing the dead-end 202 to be fixedly connected within the hoist device 102. In one example, a rotating pin can be used to secure the tether 202. Once the dead-end 202 is locked into place, the knot in the pulling tape can be released thereby enabling the pulling tape to release from the dead-end attachment means, travel through the hoist device 102 and down to ground level.

As described in greater detail infra, the dead-end 202 can be constructed or configured in such a manner so as to enable engagement into the hoist device 102 while enabling the pulling tape or rope to be removed from ground level. It will be appreciated that the features, functions and benefits of this hoist device 102 system design can alleviate conventional complexities of installing cables along sidewalls of buildings and structures.

In an alternative example, an obstruction clamp can be attached to the tether 202 thereby prohibiting entry into the hoist device 102. In other words, an obstruction clamp can be attached to one end of the strength member or dead-end thus, upon contact with the aperture on the bottom of the hoist device 102, the obstruction clamp prohibits entry and subsequent locking of the tether 202 within the hoist device 102. It will be appreciated that this obstruction clamp can be used in a test or measurement phase thereby enabling a worker to efficiently and easily establish an optimum length of the strength member. Once a measurement is established, the obstruction clamp can be removed thereby permitting the tether 202 to enter the aperture of the hoist device 102 and subsequently lock into position. It is to be appreciated that the functionality of the obstruction clamp can be configured into the tether 202 in aspects.

In one embodiment, the obstruction clamp is formed with two legs that extend beyond the diameter of the bottom aperture of a hoist device 102. Accordingly, in operation, the legs contact the bottom face of the hoist device 102 prohibiting access. In one aspect, once an installer determines the measurements are correct, the tether can be lowered and the legs can be snipped or cut off to facilitate entry and subsequent locking into position. In other aspects, the legs can be configured to fold or break off when a predetermined amount of force is applied. For example, once a measurement is made, a greater amount of force can be applied to the pulling tape causing the legs to break (or fold) from the obstruction clamp. While an obstruction clamp is described to have "legs," it is to be understood that most any shape that obstructs entry can be employed without departing from the functionality described herein. Additionally, the obstruction clamp can be designed or manufactured of most any rigid material, including but not limited to, plastic (molded or otherwise manufactured), metal, or the like. An example obstruction clamp is described in FIG. 19 that follows.

Figure 4:
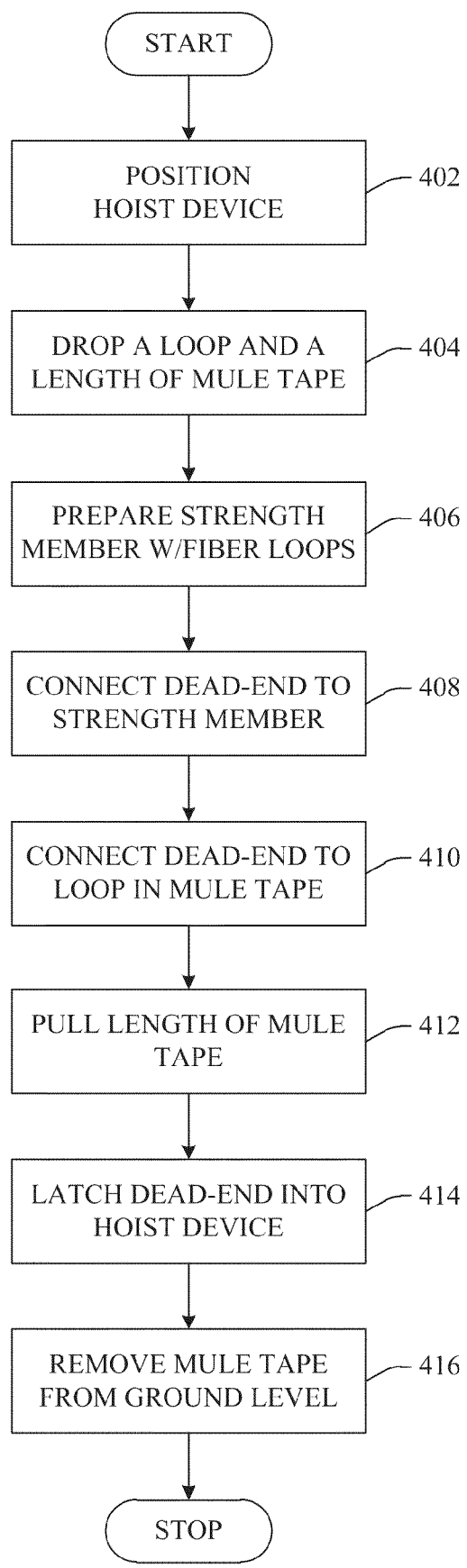
FIG. 4 illustrates an example flow chart of procedures that facilitate hoisting and terminating a strength member in accordance with an aspect of the innovation.

FIG. 4 illustrates a methodology of hoisting a cable upon a sidewall of a structure in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. Moreover, not all illustrated acts may be required to implement a methodology in accordance with the innovation.

In operation and as shown in FIG. 4, at 402, a hoist device can be positioned or installed upon the outer side of a knee wall atop a structure. For example, the hoist device can be permanently attached (e.g., bolted into the mortar or brick of a structure). In other aspects, a temporary or permanent bracket can be installed (e.g., around the knee wall) to secure the hoist device. Various bracket designs (e.g. 106 of FIG. 1) can be employed to permanently or temporarily attach the hoist device to a structure. In aspects that employ a temporary bracket, once the strength member and fiber loops are hoisted, they can be affixed to the structure outer wall and the hoist device can be removed.

In one aspect, at 404, a loop and a length of the pulling tape can be dropped from the top of the structure to ground level. More particularly, pulling tape or a rope can be installed through the device having a knot or other obstruction treatment (e.g., clip, crimp) that secures one end of a loop, the cover closed and the pulling tape or rope can be dropped down the sidewall of the structure. At or above ground level, the pulling tape or rope can be tied off, for example, ten or twelve feet from ground level.

At 406, a strength member can be prepared with fiber loops as described above. Later, when cabling is desired to be lifted up the sidewall, a craftsman can affix a tether or dead-end to the loop connection above ground level in order to hoist the cable up the side of the structure. In other words, at 408, a dead-end can be connected to the strength member and, at 410, the dead-end is attached to the looped end of the pulling tape. The other end of the pulling tape or rope can be pulled at 412 in order to lift the dead-end with cable affixed to a desired height.

One device used to connect the strength member to the pulling tape is a helical wire dead-end device that wraps around the strength member (e.g., cable). As described above, the pulling tape (or rope) can be attached to a loop in the dead-end device and used to elevate the strength member having fiber optic loops attached thereto. The helically wound device can be configured or oriented in such a manner that it is able to grasp the cable such that the craftsman can hoist the pulling tape or rope thereby lifting the cable to the knee wall location. Once the desired height is reached, at 414, the dead end device locks into the hoist apparatus. Finally, at 416, the pulling tape or rope can be removed from ground level. In other words, in examples, once the device is locked into the hoist apparatus, an angle of the pulling tape from a knotted end to a hoist device exit area enables the pulling tape to be released and subsequently pulled through the dead-end or tether connector. Accordingly, the pulling tape can be used to hoist the cable and subsequently be removed from ground level.

In accordance with the methodology of FIG. 4, upon installation, a craftsman would measure (or previously know) how much cable is needed to reach the hoist apparatus. In one aspect, the pulling tape can be marked with measurements so as to efficiently advise of a proper length. Once determined, a strength member cable is cut to a desired length. As described supra, the strength member cable would have fiber optic coils strategically located at various points within its length. These coils are used to efficiently provide fiber optic access, for example, when a customer purchases a television or networking services from a provider.

Returning to act 412, in one aspect, a pin that performs as a rotating spring-like mechanism can float within the hoist apparatus. When the loop of the tether engages the pin, it locks into position within the hoist mechanism thereby retaining the strength member atop the structure. The dead-end can be orientated such that the pulling tape or rope can be easily removed upon engagement and/or locking into the hoist device, for example, once the knotted end is released.

For example, a helical device can be conformed or configured with a double loop or conformed from a plastic or metal attachment to create an extra loop such that the pulling tape or rope can be entered into one of the loops and the locking pin can engage the other. It will be understood that this arrangement can enable the tether or dead-end to remain locked into place while the rope is easily removed via the other loop, for example, from ground level.

In other aspects, a wedge-block-equipped device can be used as a dead-end to retain the strength member cable upon hoisting. This wedge-equipped device can be configured with an attachment means that enables the dead-end to latch to a locking means. Additionally, this attachment means can permit the pulling tape or rope to be withdrawn from ground level. While specific dead-end and/or tether examples of attaching the strength member for hoisting, it is to be understood and appreciated that alternatives (e.g., netting) exist that can be employed to facilitate effective attachment, locking and rope removal. These alternatives are to be included within the scope of this disclosure and claims appended hereto.

Figure 5:
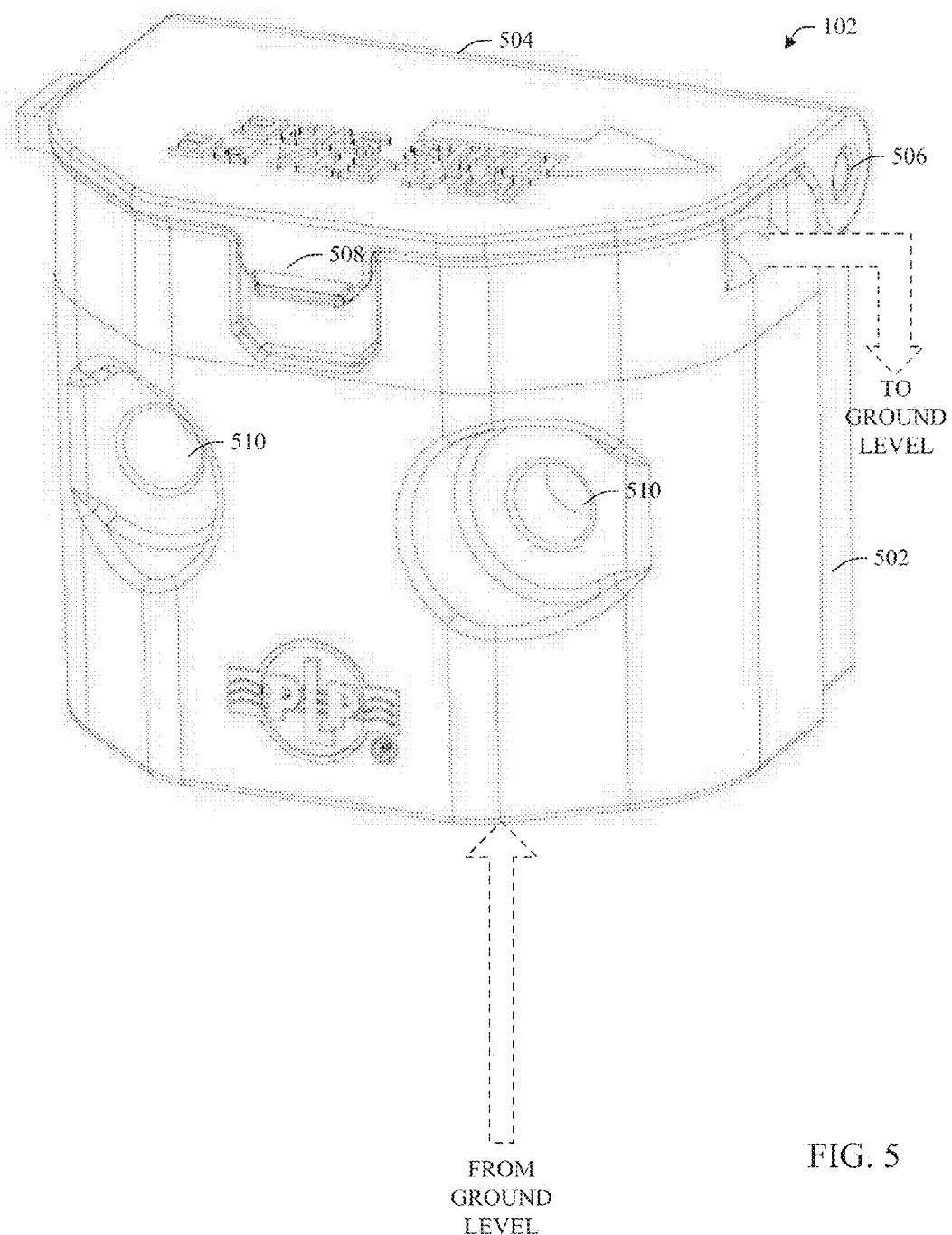
FIG. 5 illustrates a front perspective view of a hoist device in accordance with an aspect of the innovation.

Turning now to FIG. 5, illustrated is a perspective view of a hoist apparatus 102 in accordance with an aspect of the innovation. While specific configurations and design options and treatments are shown, it is to be understood that alternative aspects can include other design options and configurations without departing from the spirit and scope of this disclosure and claims appended hereto. Accordingly, these alternative aspects are to be included within the scope of this disclosure and claims appended hereto.

As shown, apparatus 102 is constructed of a housing 502 having a lid 504. In this example, the lid 504 employs a hinging means 506 that enables the lid 504 to hinge into an open position. When closed, the lid 504 can be equipped with a latching means 508 that retains the lid 504 in the closed position. The example latch 508 is a pressure-actuated latching means. Other latching means can be used in alternative designs. Similarly, the hinging means 506 is optional such that alternative embodiments can employ a snap-fit lid design (not shown). It is to be appreciated that these alternatives are but examples of numerous design options—all of which are to be included within the scope of this disclosure and claims appended hereto.

As will be described in greater detail below, the interior of the housing 502 includes a locking mechanism capable of capturing a tether or dead-end as previously described. An example locking mechanism as well as example dead-end designs will be described in greater detail upon a review of the figures that follow.

The dashed arrows indicate a direction of travel of the aforementioned pulling tape in accordance with this aspect. In other words, the pulling tape is threaded through the bottom surface of the housing 502. After passing through the locking mechanism chamber, the pulling tape exits the housing 502 on the upper right area as shown. Upon exiting, the pulling tape travels back into the direction to ground level. Thus, the pulling tape can enter the housing 502 from ground level, pass through the locking chamber (not shown) and exit out the top side of the housing 502 back to ground level as indicated by the dashed arrow.

The housing 502 can also be equipped or configured with attachment means or mounting apertures 510. While two separate apertures 510 are shown, other aspects can employ more or fewer apertures to suitably mount the device 102. Although not shown, an alternative design can be employed along with a mounting bracket (not shown) (e.g., around a knee wall). These, and other, alternatives will be appreciated by those skilled in the art are to be included herein.

Figure 6:
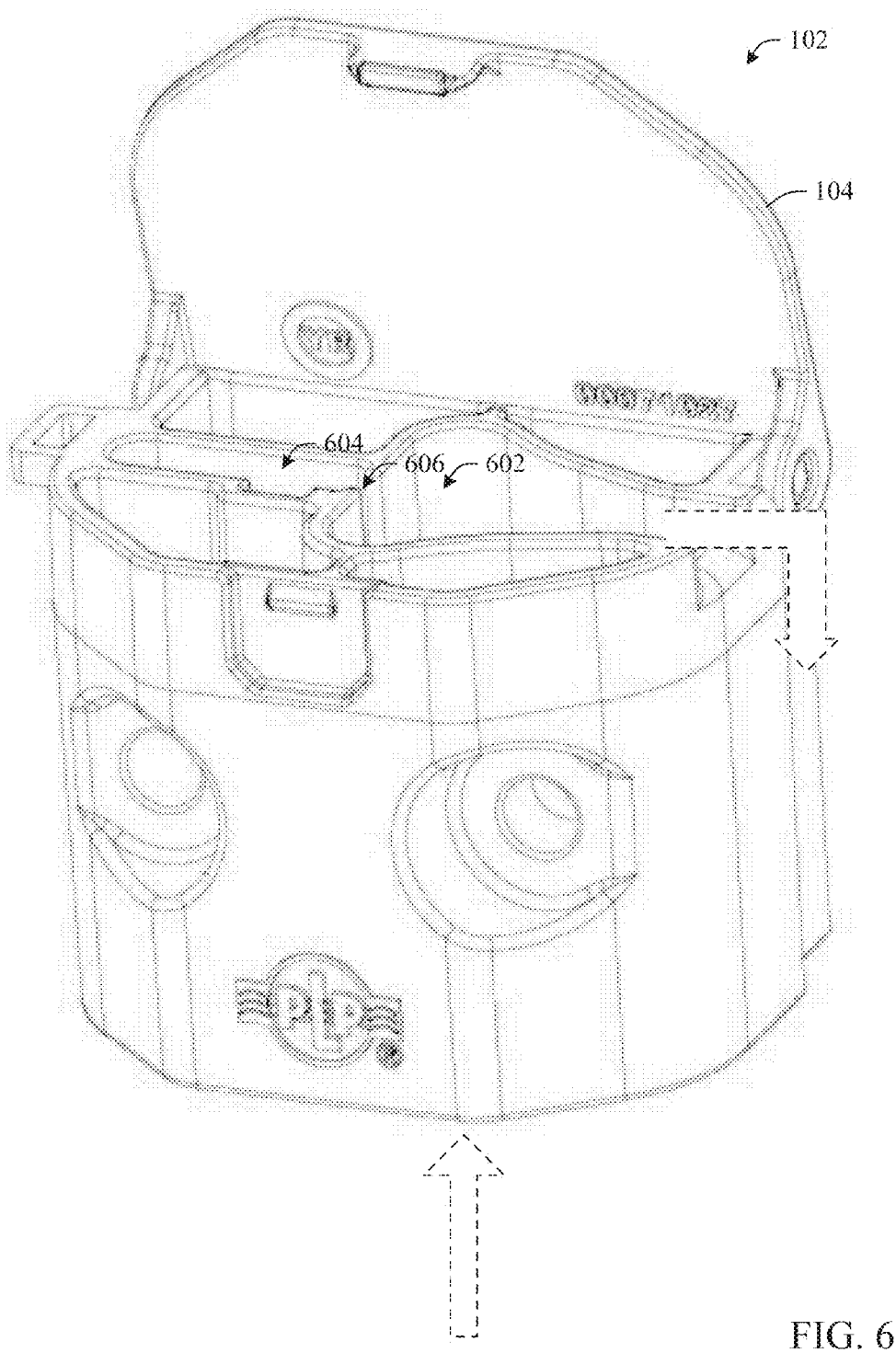
FIG. 6 illustrates a front perspective view of a hoist device with its lid open in accordance with an aspect of the innovation.

FIG. 6 illustrates an alternative perspective view of the embodiment of FIG. 5. In particular, FIG. 6 illustrates the lid 504 in an open position thereby exposing the locking cavity or chamber 602. This locking cavity 602 is shaped in such a manner so as to allow the pulling tape (or rope) to freely enter and exit the cavity 602. Also illustrated by the open lid 504 is a pin cavity 604 that is in communication with the locking cavity 602. In other words, as will be better understood upon a discussion of the example locking pin (not shown) the pin cavity 604 houses a free floating spring-clip pin. A portion of the pin travels from the pin cavity 604 to the locking cavity 602 via a common or shared opening 606 (e.g., slot) between the two cavities 602, 604.

It is to be understood that the housing 502 and lid 504 can be manufactured from most any suitably rigid material. In the illustrated example, it is contemplated that the housing 502 and lid 504 are molded from plastic however, other materials such as metals, composites, fiberglass, etc. can be employed without departing from the spirit and scope of the innovation. The locking pin as will be described later is manufactured of metal in the example. Similar to the other components, it is to be understood that other suitably rigid materials (e.g., plastic) can be used to manufacture the locking pin without departing from this disclosure.

Figure 7:
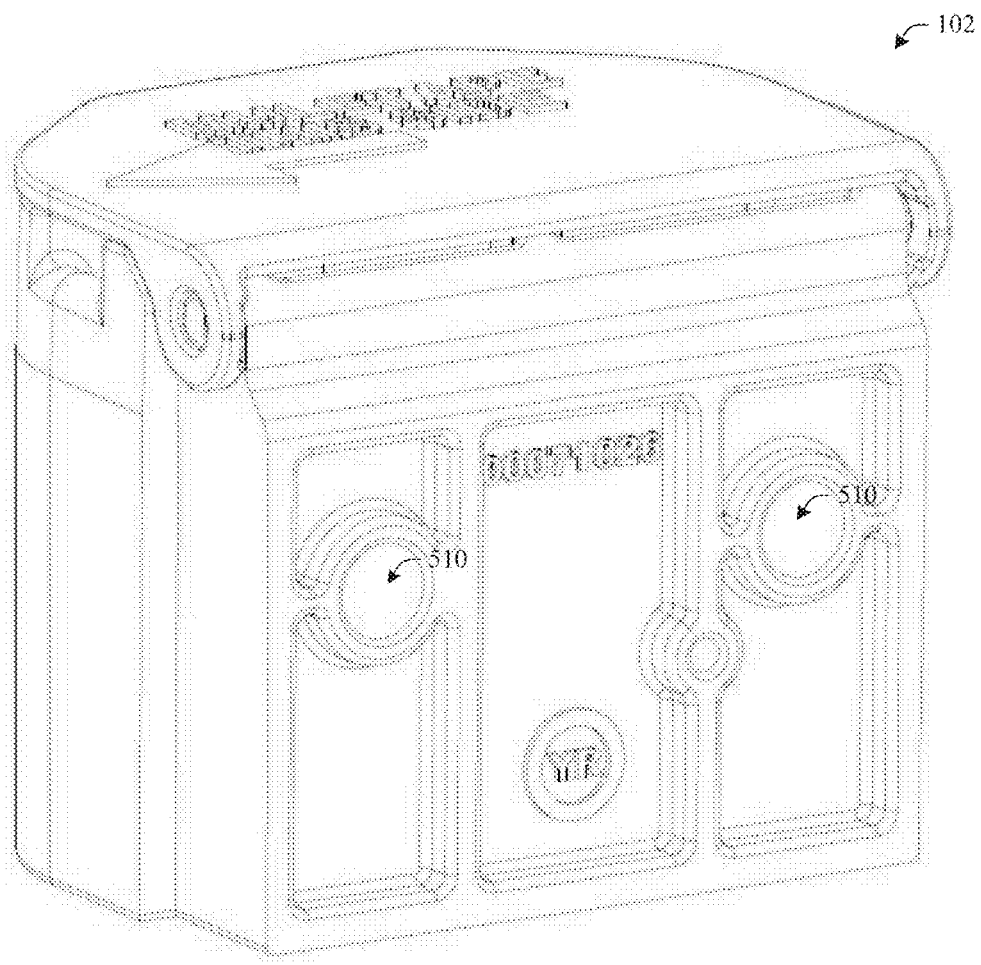
FIG. 7 illustrates a rear perspective view of a hoist device in accordance with an aspect of the innovation.

FIG. 7 illustrates a rear view of apparatus 102 in accordance with this example embodiment. As shown, the mounting apertures 510 or means are in communication from the front side of the device to the rear as shown in FIG. 7. These apertures 510 are configured to accept standard hardware bolts, for example, for fixedly attaching the device 102 to a sidewall of structure as shown in FIGS. 1, 2 and 3. Additionally, these mounting apertures 510 can be employed to attach the apparatus 102 to a mounting bracket as described in greater detail infra.

Figure 8:
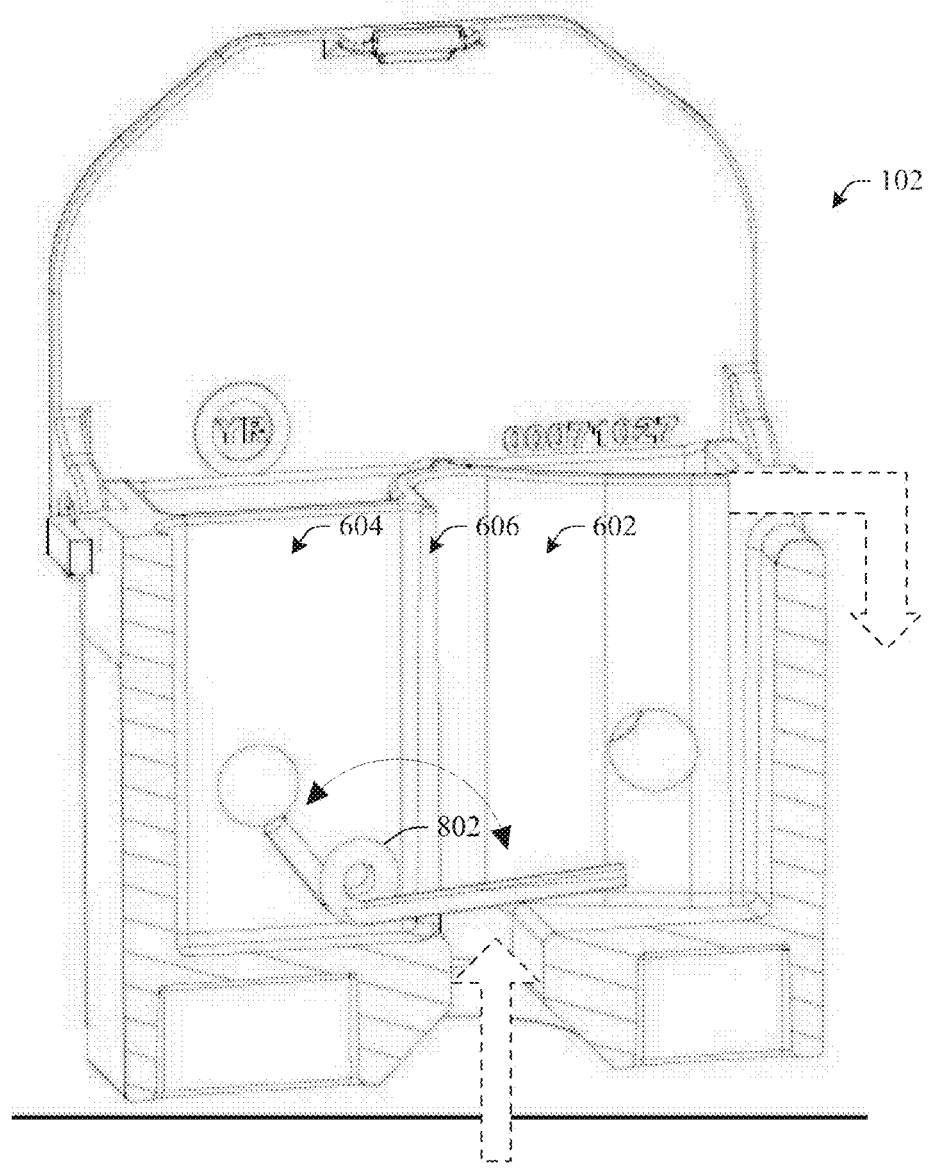
FIG. 8 illustrates a front cross-sectional view of a hoist device in accordance with an aspect of the innovation.

Referring now to FIG. 8, a front cross-sectional view of the example hoist apparatus 102 is shown. Consistent with the figures described earlier, dashed arrows are illustrated to demonstrate the path of the mule tape. Additionally, each of the locking cavity 602, pin cavity 604 and shared opening or transition 606 is illustrated in the cut-away view. The free floating pin 802 is able to pivot about its coiled section as depicted by the arc arrow.

Upon transitioning the pulling tape through the bottom of the apparatus 102, the dead-end (202 of FIG. 2), which is removably attached to the pulling tape, contacts the pin 802 forcing it to pivot in an upward direction. Because the dead-end is treated with a connector (e.g., multi-loop design), the dead-end engages the pin 802, the pin 802 rotates and springs back to its locked position (as shown) and retains the dead-end in place. Thereafter, the tape can be pulled from the ground and disengaged from the dead-end.

Figure 9:
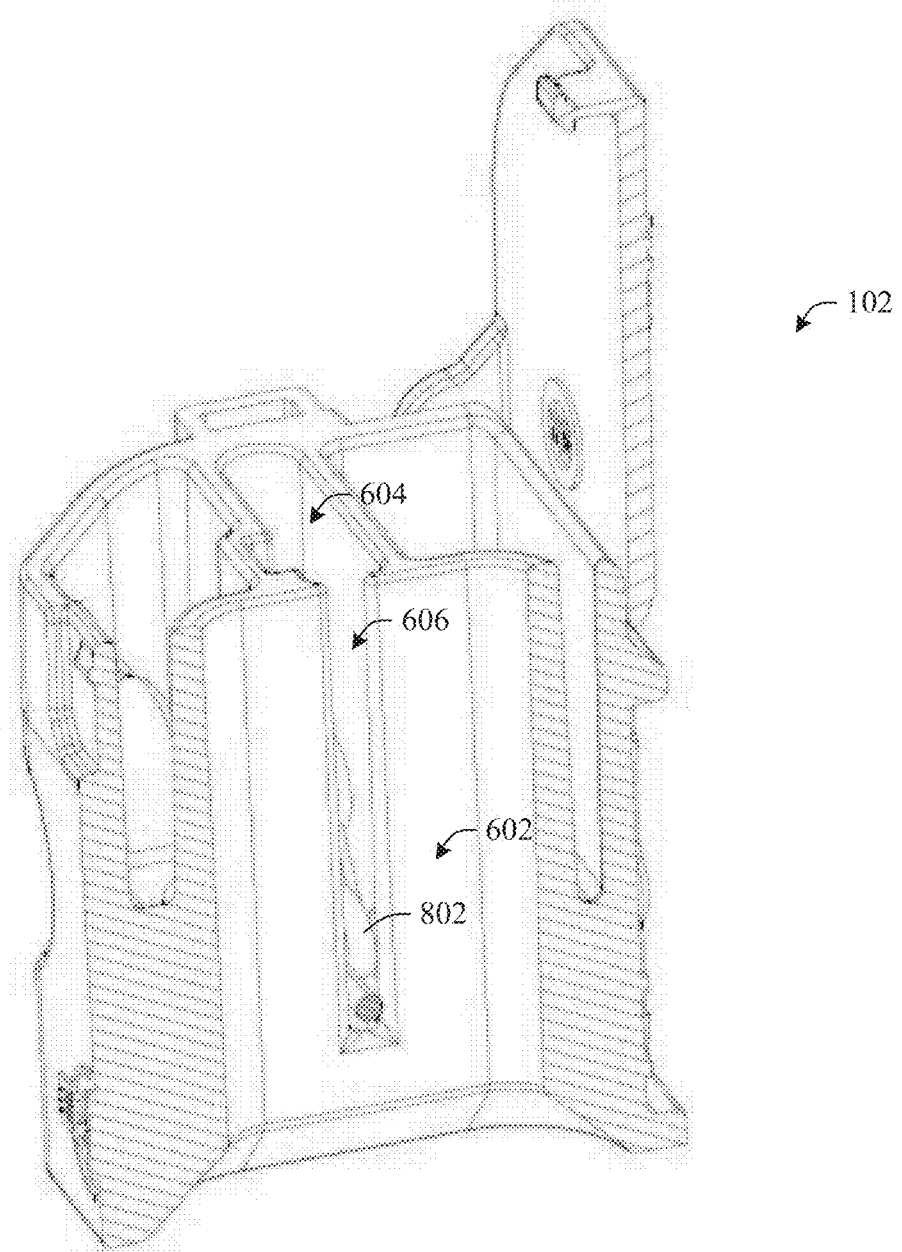
FIG. 9 illustrates a side cross-sectional view of a hoist device in accordance with an aspect of the innovation.

FIG. 9 illustrates an alternative side cross-sectional view of the apparatus 102. As illustrated, the pin 802 spans the transition 606 between the pin cavity 604 and the locking cavity 602. It will be appreciated that the cavities 602, 604 and the transition 606 are configured and sized to promote ease and efficiency of operation (e.g., pulling tape motion and dead-end engagement). In yet other aspects, as described infra, a knot or other treatment can be applied to one end of the pulling tape such that the treated end can be maintained within cavity 604 and a loop can be dropped to the ground level. Once the loop is drawn from the ground level to the apparatus 102, the knot or treatment can be released from the cavity, passed through the dead-end treatment and exit the apparatus 102 to ground level. This example will be better understood upon a review of the figures that follows.

Figure 10:
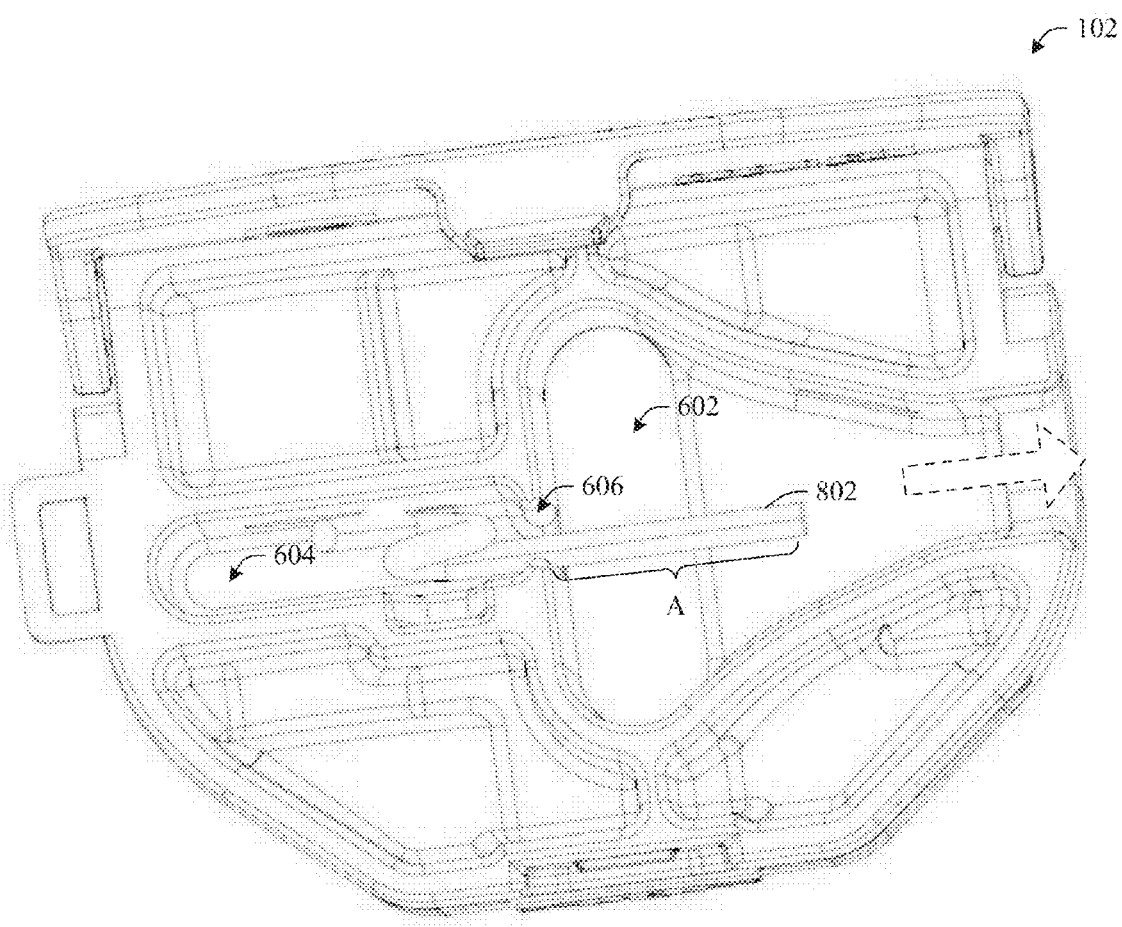
FIG. 10 illustrates a top view of a hoist device in accordance with an aspect of the innovation.

FIG. 10 illustrates a top view of apparatus 102. As shown in FIG. 10, portion "A" of pin 802 is indicative of the portion that engages the dead-end attached to the strength member. As described supra, upon initial contact with the dead-end, pin 802 pivots upward to allow the dead-end loop (or attachment means) to pass. Once passed, the pin 802 pivots downward engaging the loop of the dead-end. It will be appreciated that the pin 802, as shown, can be equipped with spring-like properties. This spring (preload or winding) mechanism assists in proper and efficient engagement.

Figure 11:
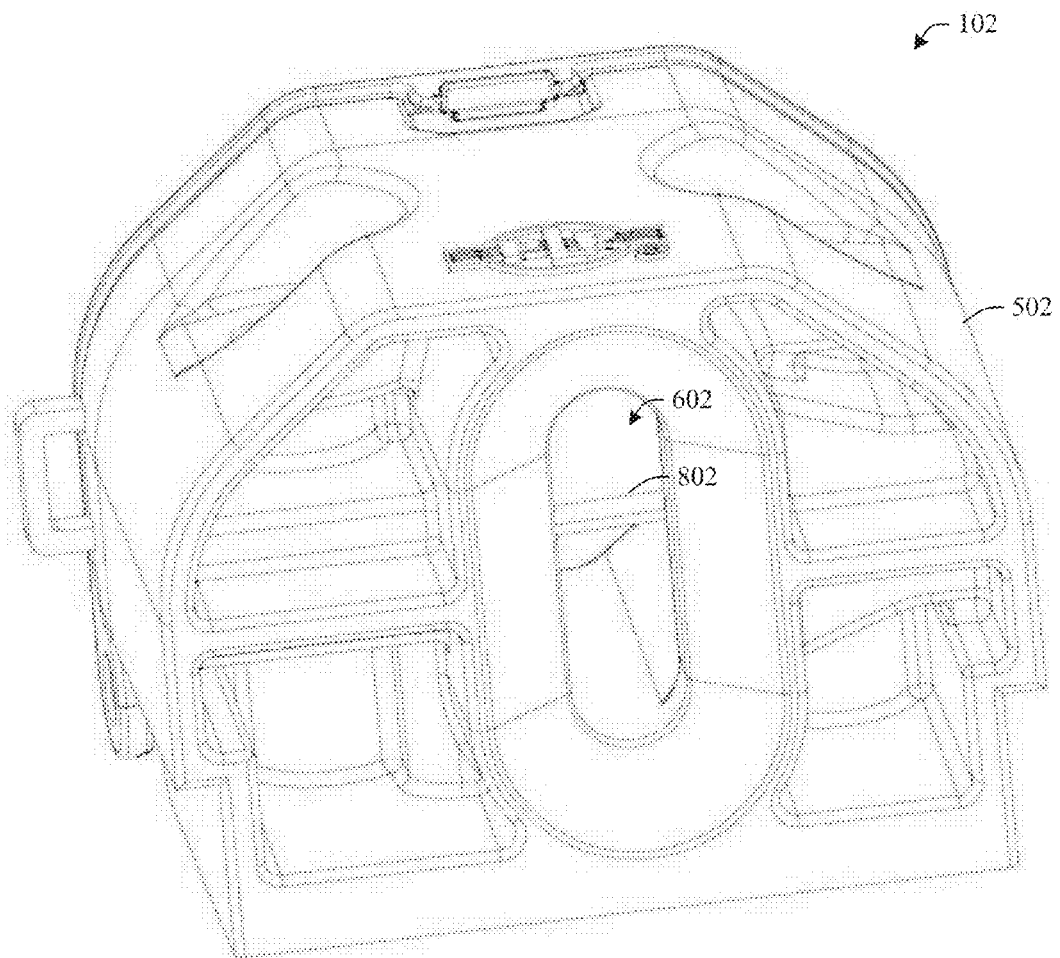
FIG. 11 illustrates a bottom view of a hoist device in accordance with an aspect of the innovation.

FIG. 11 illustrates a bottom side view of the hoist device 102 in accordance with the example embodiment. As shown, an oval shaped aperture can be employed to enter the locking cavity 602 from the underside of the housing 502. The oval opening can have tapered entry sides which assist in lowering motion friction of the tape into the housing 502. These tapered sides along with the shape of the opening facilitate proper alignment of the dead-end to ensure efficient termination with the locking pin 802. The locking pin 802 is illustrated in FIG. 11 in the locked-down position. As previously stated, while specific configurations and orientations are illustrated, it is to be understood that alternative designs can be employed without departing from the features, functions and benefits of the innovation as disclosed and claimed herein.

Essentially, the hoist apparatus 102 can be a mountable base structure with a spring-like clip or pin 802 that secures a dead-end or similar loop-like product (e.g., tether) that is hoisted up for termination. As shown, the bottom surface has a slot with a tapered opening that can guide the dead-end into place regardless of the initial orientation. As the dead-end travels through the slot, a spring action clip or pin 802 secures the dead-end into place. The spring-action clip 802 can be formed with one leg longer than the other. The longer leg is used to secure the dead-end into place and the shorter leg can be bent at an angle that will not permit the longer leg from rotating more than 90 degrees so as to ensure a positive engagement with the dead-end or tether.

Figure 12:
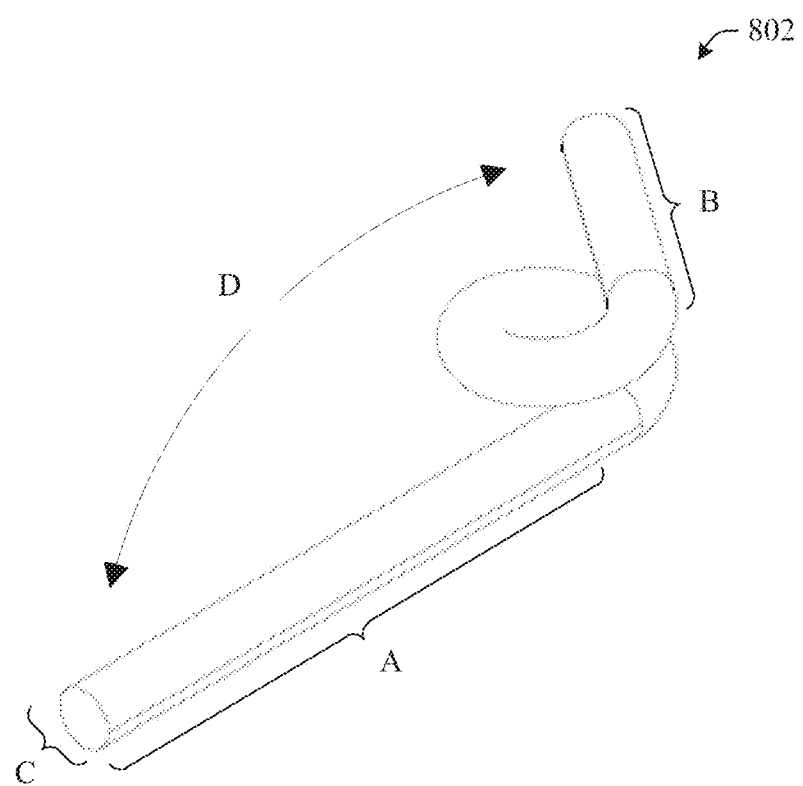
FIG. 12 illustrates a perspective view of an engagement or latch pin in accordance with an aspect of the innovation.

FIG. 12 illustrates a perspective view of a locking pin 802 in accordance with the described embodiment. In this aspect, the pin can be manufactured of metal, e.g., galvanized or stainless steel. The coiled portion can provide preload or spring-like properties that assist in sufficient and efficient locking of the dead-end within the housing. Consistent with the aforementioned description, portion "A" includes the area that engages with the dead-end loop. In one specific example, the length of "A" can be 1⅜ inches. This length "A" resides within the locking cavity as described.

Portion "B" resides within the pin cavity of the housing. In one specific example, the length of portion "B" can be ½ inch. The diameter "C" of the pin, in one aspect, can be ⅛ inch. Further, the arc "D" can be, in this aspect, 125 degrees. While specific dimensions of pin 802 are described, it is to be understood that these dimensions are provided to add perspective to the innovation and not intended to limit the scope of this innovation in any manner. Additionally, while the locking pin is shown and described as a coiled stainless or galvanized steel pin, it is to be understood that other locking mechanisms and pins can be employed without departing from the features, functions and benefits of the innovation. For example, pins that can be cut (e.g., laser cut) from sheets of metal are to be included within the scope of this specification. These and other variations of locking pins or mechanisms are to be included within the scope of this disclosure and claims appended hereto.

Figure 13A:
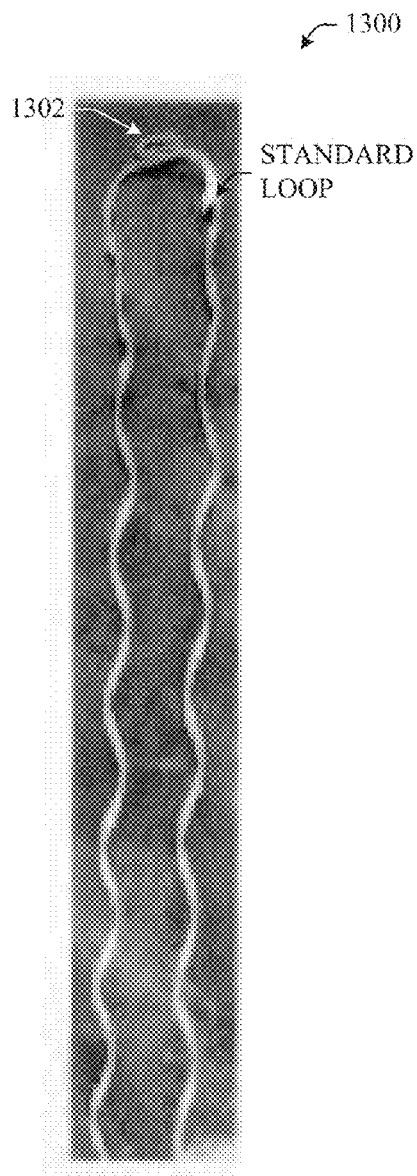
FIG. 13 illustrates an example helically wound dead-end tether in accordance with an aspect of the innovation.
Figure 13B:
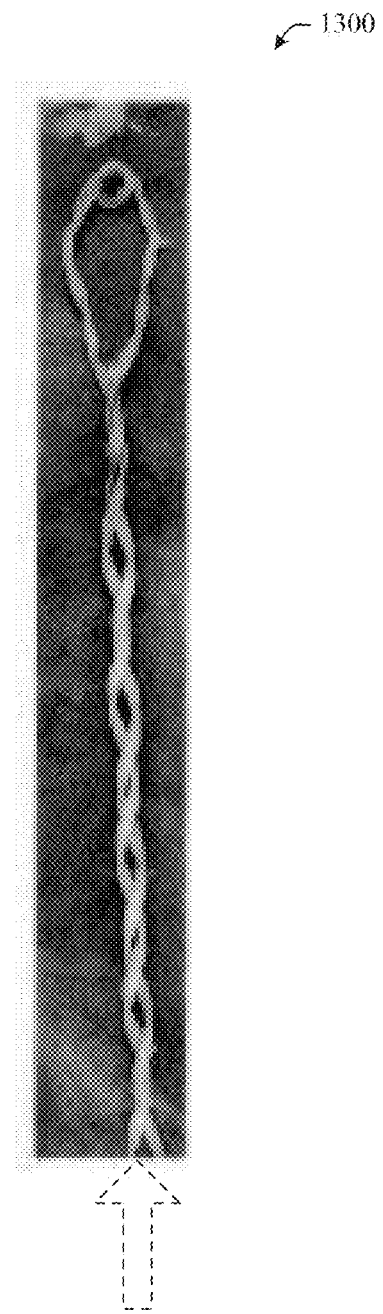

FIGS. 13A and 13B illustrate an example dead-end or tether 1300 in accordance with aspects of the innovation. The tether, or dead-end, has a substantially similar forming structure of a standard helically wound dead-end. In addition, as shown, the tether 1300 is formed to have an additional loop 1302 incorporated in either the top or bottom of the standard loop. As disclosed above, this additional loop 1302 can be employed with most any pulling tool. In the described example, the pulling tool is a "pulling tape" or rope which can be used to hoist the dead-end 1300 to its termination location (e.g., within hoist apparatus 102 of FIG. 1). The extra loop 1302 protects the pulling tape from being pinched between the dead-end 1300 and the supporting pin (e.g., 802) at termination allowing for easy assembly at installation and removal of the rope following termination. While the example of FIG. 13A illustrates the additional loop 1302 above the standard loop, it is to be understood that other aspects employ the additional loop 1302 below (or within) the standard loop. These and other contemplated aspects are to be included within the scope of this specification.

It will be understood by those knowledgeable in the art that, a strength member or cable can be inserted within the helical wires as shown in FIG. 13B. The helical wires can grasp the strength member thereby facilitating hoisting to the termination location. Other aspects can attach to the strength member in other manners. For example, netting (not shown) can be used to encompass the strength member thereby adhering for hoisting to the termination location.

Figure 14:
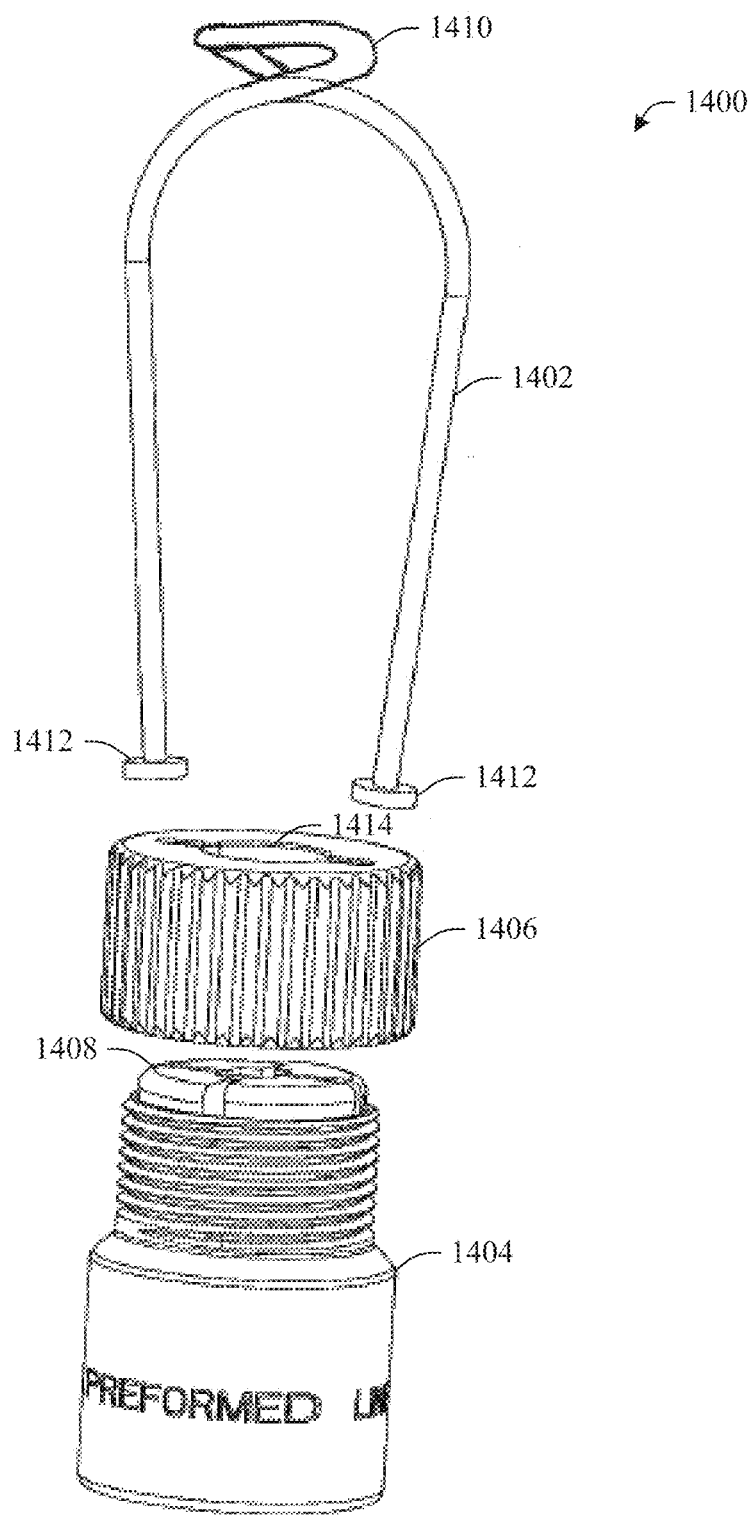
FIG. 14 illustrates spring loop wedge cap in accordance with an aspect of the innovation.
Figure 15:
FIG. 15 illustrates an alternative spring loop wedge cap in accordance with an aspect of the innovation.
Figure 16:
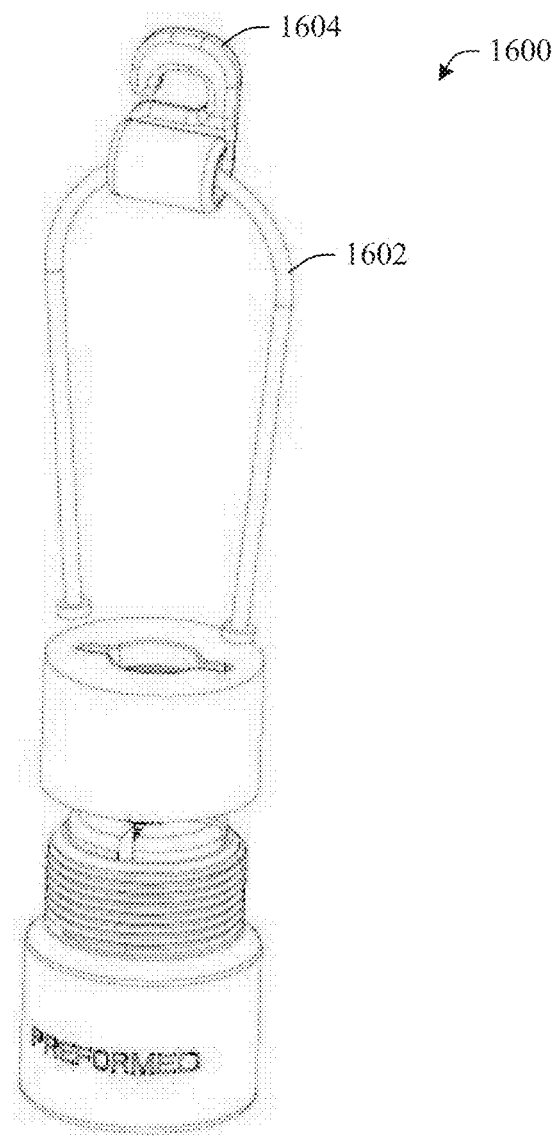
FIG. 16 illustrates an example crimp loop installed upon a spring loop wedge cap in accordance with an aspect of the innovation.

FIGS. 14-16 illustrate other alternative manners by which a strength member can be formed to facilitate a dead-end at a hoist device as shown in FIG. 1.

Referring first to FIG. 14, a dead-end connector 1400 is shown. As illustrated, the connector 1400 can include a wire loop 1402, a base 1404 and cap 1406. The base 1404 encapsulates a series or plurality of wedge blocks 1408 that, when the cap 1406 is tightened upon the base 1404, the wedges 1408 capture and tighten around a cable or strength member.

The wire loop 1402 or fiber hoist spring loop can be a standard wire loop with an additional smaller loop 1410 on the top and "nail heads or bent legs" 1412 at the ends. When the ends 1412 are squeezed together, they will spring back into a notch or groove 1414 in the cap 1406. The nail heads 1412 hold the wire loop 1402 from being pulled out of the cap 1406. As described with regard to the dead-end of FIGS. 13A and 13B, the additional loop 1410 on the top loop can be employed with most any pulling tool, e.g., pulling tape or rope. The pulling tape can be attached to the smaller loop or attachment loop and the wedge clamp device 1400 can be hoisted to pull a strength member or cable to position for termination.

It will be understood that the extra loop 1410 can protect the pulling tape from being pinched between the spring loop 1402 and the supporting pin (e.g., 802 of FIG. 8) at termination. This will allow for easy assembly at installation and removal of the tape or rope from ground level following termination.

FIG. 15 illustrates an alternative example of a fiber hoist tapered wedge device (e.g., dead-end) 1500 in accordance with aspects. As shown, the spring loop 1502 of the device 1500 employs a single loop rather than a dual loop as shown in FIG. 14. In operation, the spring loop 1502 is installed in a similar manner and used to terminate via a retention pin as previously described.

FIG. 16 illustrates yet another example of a fiber hoist tapered wedge device 1600 in accordance with aspects. The operation of this device 1600 is similar to that of the devices of FIGS. 14 and 15 however, the spring loop 1602 is equipped with a crimped-on second loop 1604. As will be understood in view of the previous discussion, this second loop 1604 can be employed with most any pulling device, e.g., pulling tape or rope. Additionally, the crimped second loop 1604 can facilitate easy installation and removal of the pulling tape or rope upon engagement at termination.

Figure 17:
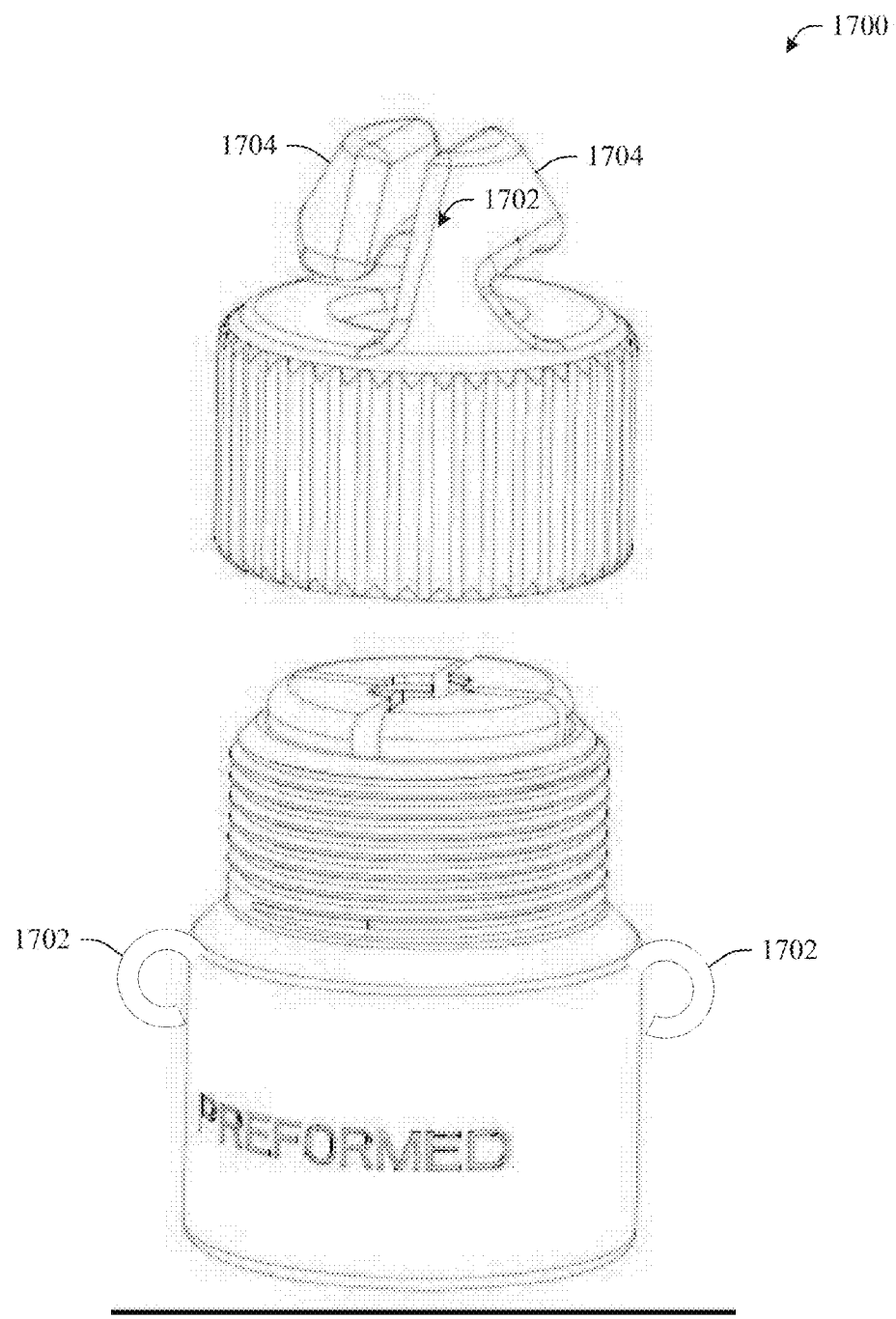
FIG. 17 illustrates an example hoist tapered wedge cap in accordance with an aspect of the innovation.

FIG. 17 illustrates yet another example cap device 1700 in accordance with aspects of the innovation. The device 1700 employs a cone-shaped design 1702 that performs as a self-guiding feature which allows it to pass through a tapered hole in a locking device for termination of a cable (or strength member). In this example, the tapered hole would be disposed within the hoist device (e.g., 102 of FIG. 1). This ensures that the wedge clamp device 1700 will be orientated correctly and pass through the locking device with ease. The device 1700 can also have a hooking feature built-in such that a rope or pulling tape loop can easily be secured to the cap for hoisting.

The hooks 1704 are oriented in opposing directions to each other so that the rope or pulling tape does not easily become removed or slip off. Once the wedge travels through the tapered hole of the mounting device (or hoist device), a spring-like feature can fully engage securing the wedge 1700 in place. In this example, the spring-like feature has tabs 1706 (e.g., four tabs) that have a spring action so that they can compress while travelling through the hole, but then spring back to their original state after clearing the hole. In result, the wedge is fully terminated at the desired location. It is contemplated that other retention and/or spring attachment means can be employed in other aspects. These alternatives are to be included within this disclosure and claims appended hereto.

Figure 18:
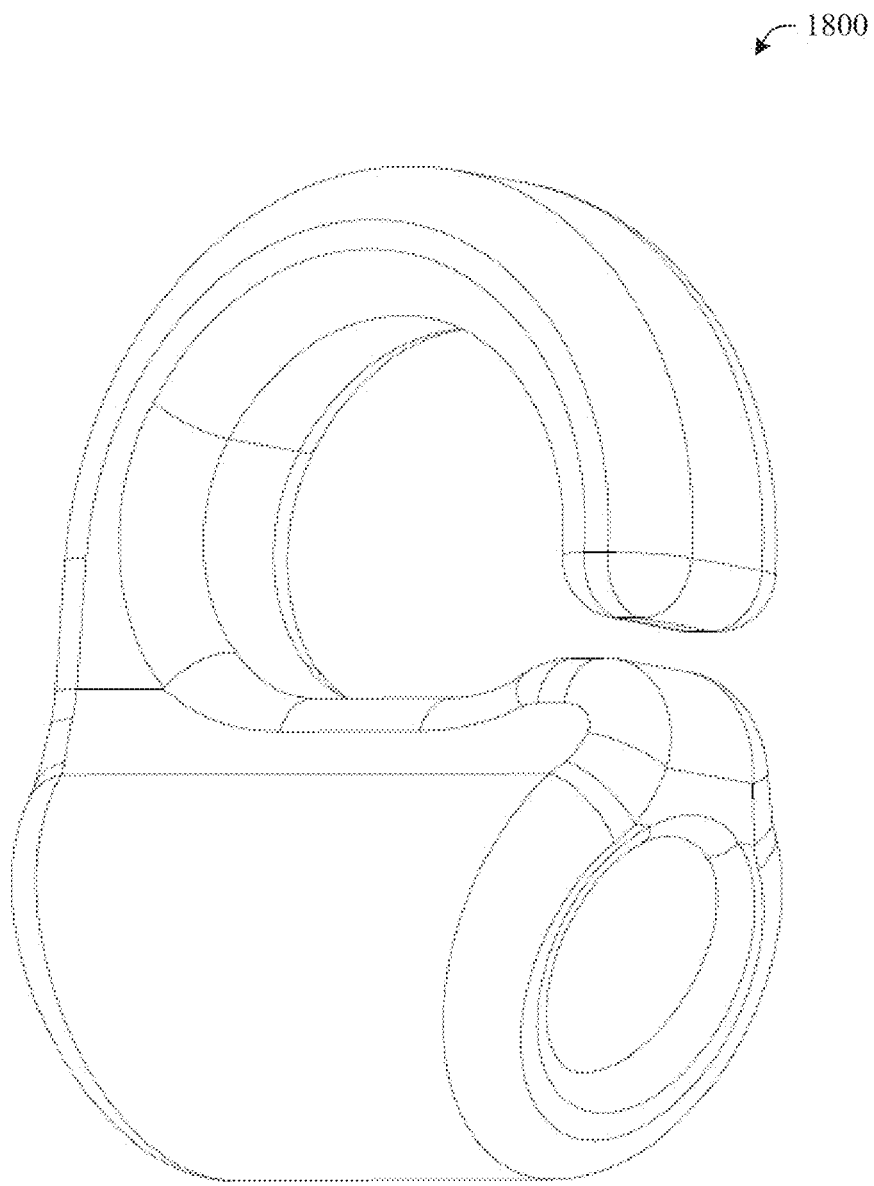
FIG. 18 illustrates a perspective view of an example loop device in accordance with aspects of the innovation.

FIG. 18 illustrates yet another aspect of a connection device 1800 in accordance with the innovation. In accordance with this aspect, the "loop" located at the top is not merely a bent circle on the top of a wire, using the wire itself. Rather, the loop is a separate piece 1800 as shown in FIG. 18. In aspects, this device 1800 can be molded from plastic or manufactured from other suitably rigid material. The device 1800 can snap or press fit onto the top of the dead-end, wire or strength member.

Figure 19:
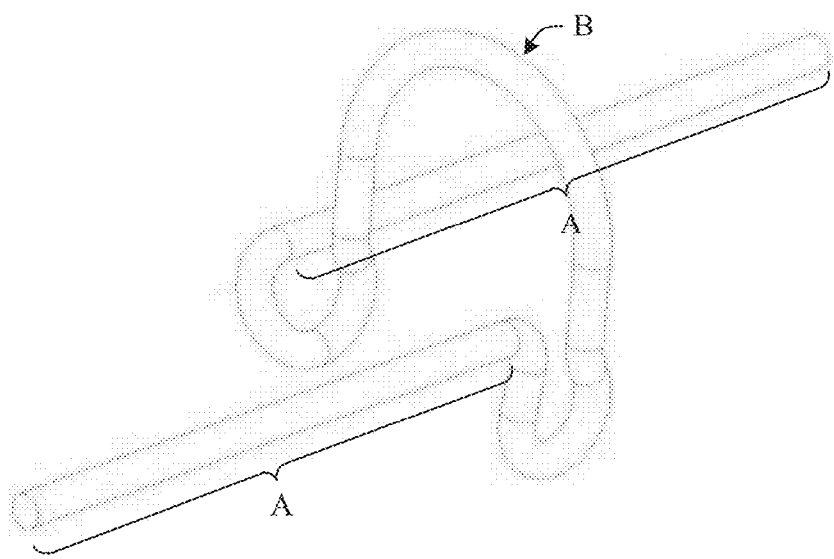
FIG. 19 illustrates an example obstruction clamp in accordance with aspects of the innovation.

FIG. 19 illustrates an example obstruction clamp 1900 as described above. For example, the obstruction claim of FIG. 19 can be used to prohibit entry and locking of a dead-end device. Using this example obstruction clamp 1900, once the installer determines that measurements are correct, the tether can be lowered down the structure sidewall and the legs (A) snipped off so that it can be permanently installed. As shown, this obstruction clamp 1900 also has the looped feature (B) that allows the pulling tape (or rope) to easily be removed. As stated above, it is to be appreciated that other aspects of obstruction clamps exist without departing from the spirit and scope of the innovation described and claimed herein.

Figure 20:
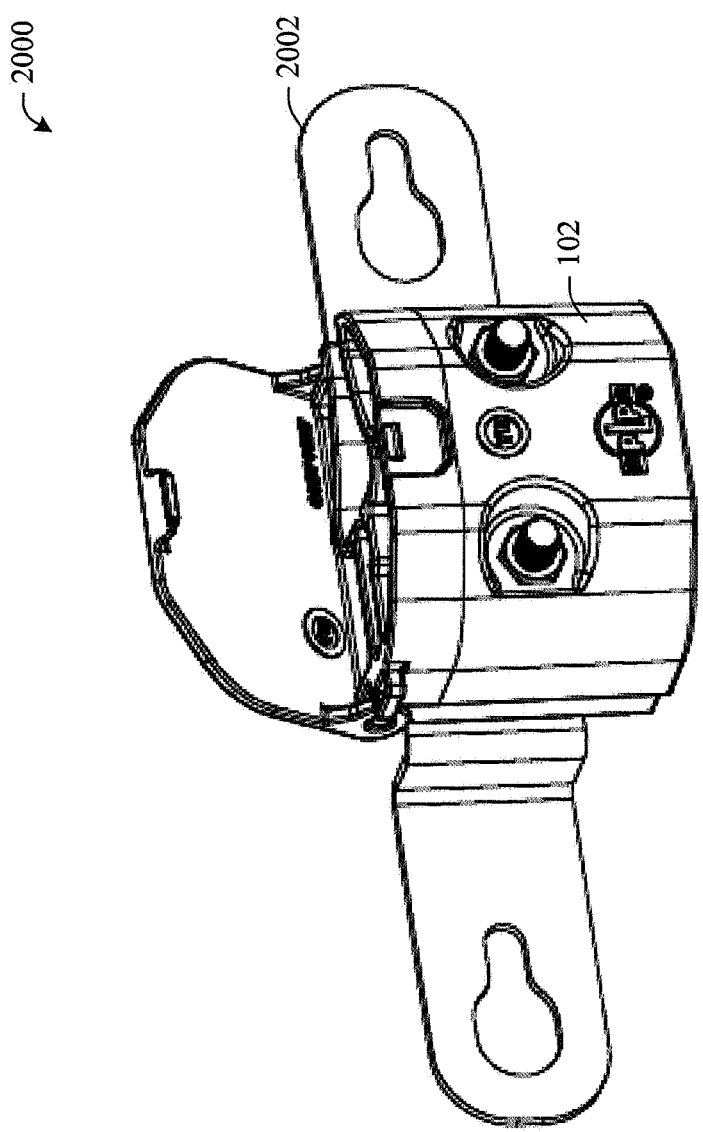
FIG. 20 illustrates an example mounting bracket assembly in accordance with an aspect of the innovation.

Referring now to FIG. 20, an example mounting assembly 2000 is shown in accordance with aspects of the innovation. As illustrated, an example bracket 2002 is shown as being capable of mounting a hoist apparatus 102 to a surface, such as a knee wall or other structure wall. It is to be appreciated that the bracket 2002 can be manufactured from steel, aluminum, plastic, alloy, composite or the like. Further, while the bracket 2002 is illustrated with two mounting eyelets, other aspects can be employed that include more or fewer eyelets without departing from the spirit and/or scope of the innovation.

Figure 21:
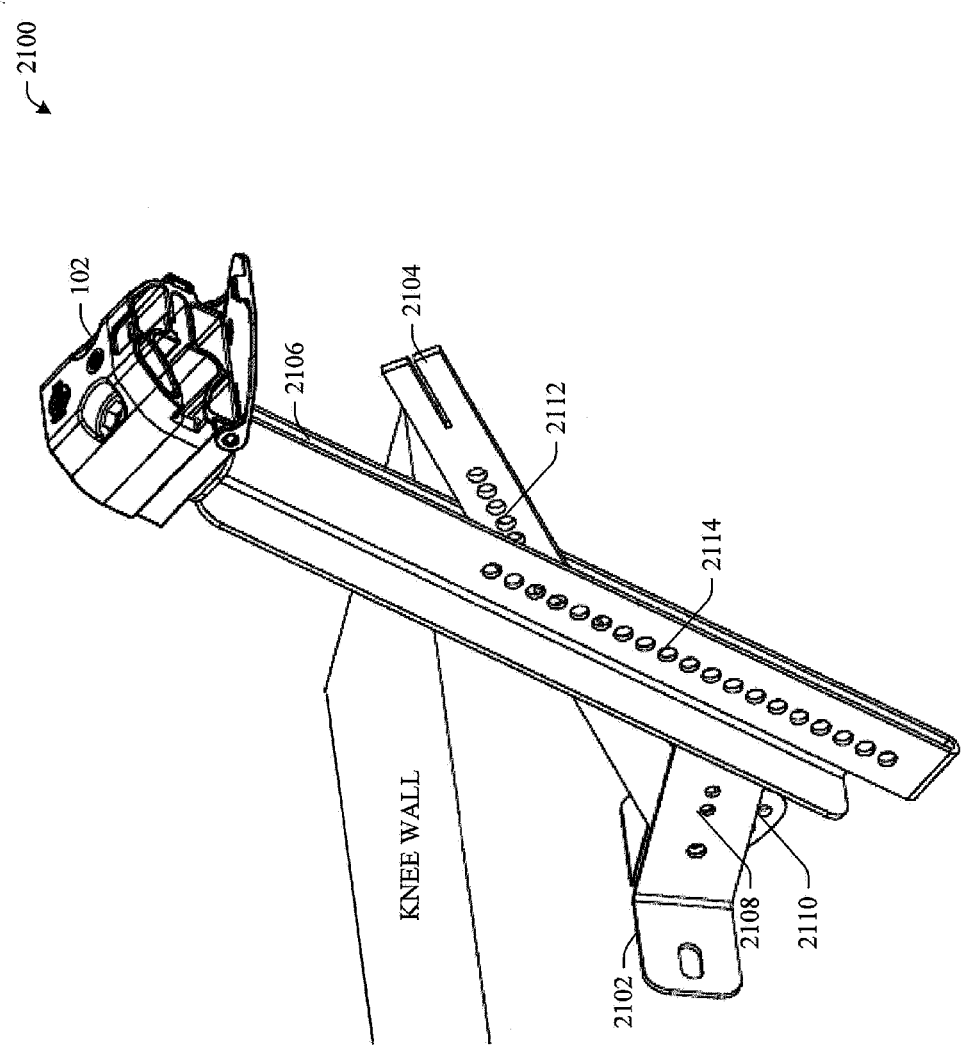
FIG. 21 illustrates an example mounting bracket assembly in a pre-operation position in accordance with aspects of the innovation.

FIG. 21 illustrates yet another example mounting assembly 2100 in accordance with aspects of the innovation. Generally, mounting assembly 2100 can include a mounting bracket 2102, a connector arm 2104 and a mounting arm 2106. As illustrated, the mounting bracket 2102 can be attached to a surface, for example, to an inner surface of a knee wall as shown. In operation, standard hardware can be employed to attach the bracket 2102 to the wall.

As illustrated, the mounting bracket 2102, in aspects, can be configured by folding substantially identical halves such that connector arm 2104 can be inserted therebetween. Each halve of the mounting bracket 2102 can be equipped with a plurality of adjustment holes 2108. While three holes are shown, it is to be understood and appreciated that other aspects can include more or fewer holes by design or preference.

In operation, the connector arm 2104 can be equipped with mating holes 2110 that match holes 2108. A bolt, pin (or other pin-like device) can be inserted into the holes (2108, 2110) to connect the two components (2102, 2104), e.g., to pivotably connect the components. Similarly, the connector arm 2104 can be equipped with a plurality of holes 2112 along its length. As illustrated, these holes 2112 can match to holes 2114 in mounting arm 2106. Once matched to a desired hole, or set of holes, a bolt, pin or other pin-like device can be inserted into the holes (2112, 2114) to fix the components (2104, 2106) together.

Figure 22:
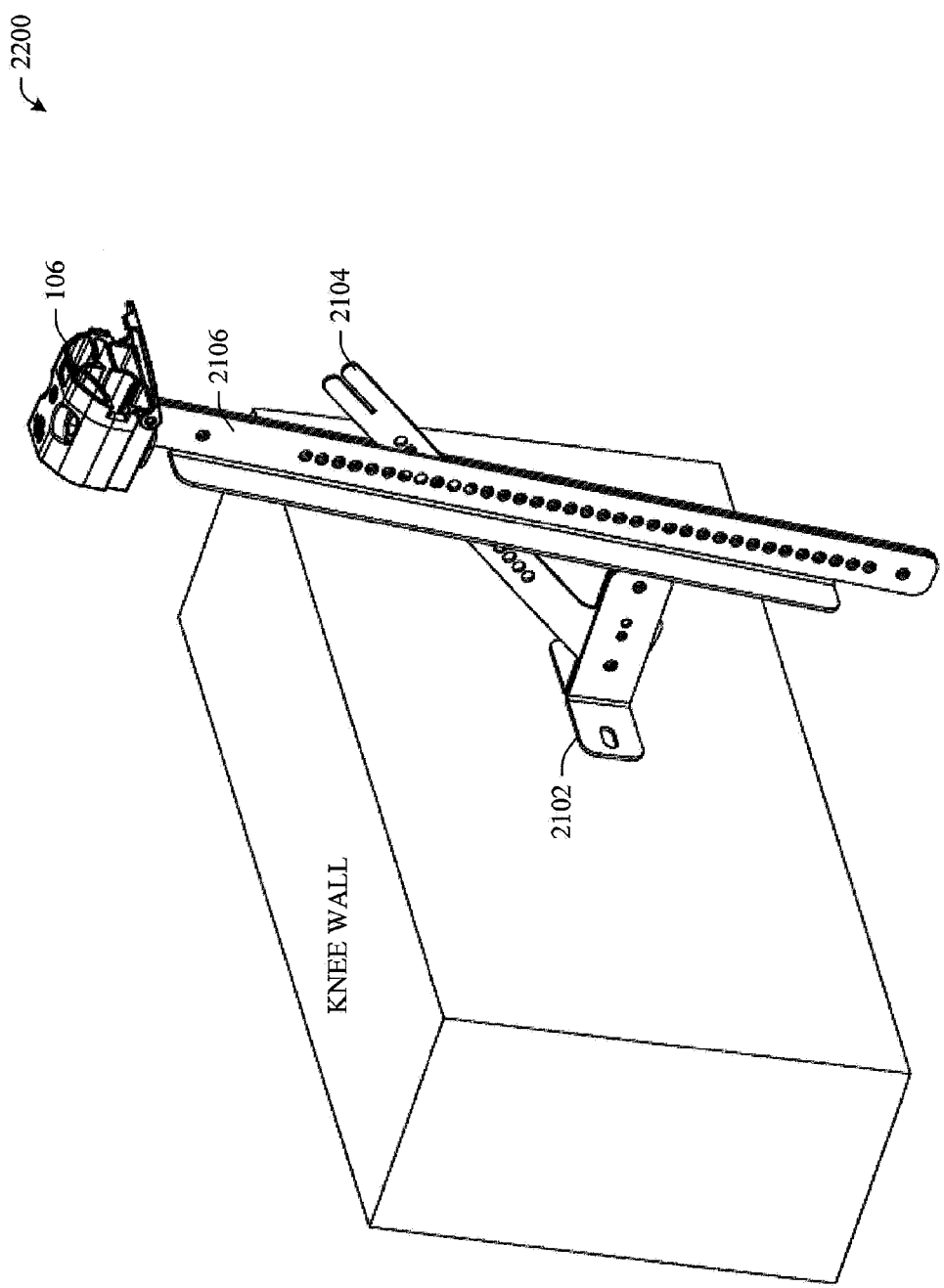
FIG. 22 illustrates an alternative example mounting bracket assembly in a pre-operation position in accordance with aspects of the innovation.

FIG. 22 illustrates yet another aspect of a mounting bracket assembly 2200 in accordance with aspects of the innovation. As shown in the aspect of FIG. 22, mounting arm 2106 can be manufactured of two identical (or substantially identical) halves such that connector arm 2104 can be inserted therebetween. While mounting arm 2106 and bracket 2102 are shown and described to effectively "sandwich" components therebetween, it is to be understood that other aspects can employ single layer components (2102', 2106' (not shown)) such that connection is made on a face rather than "sandwiched" between layers.

Figure 23:
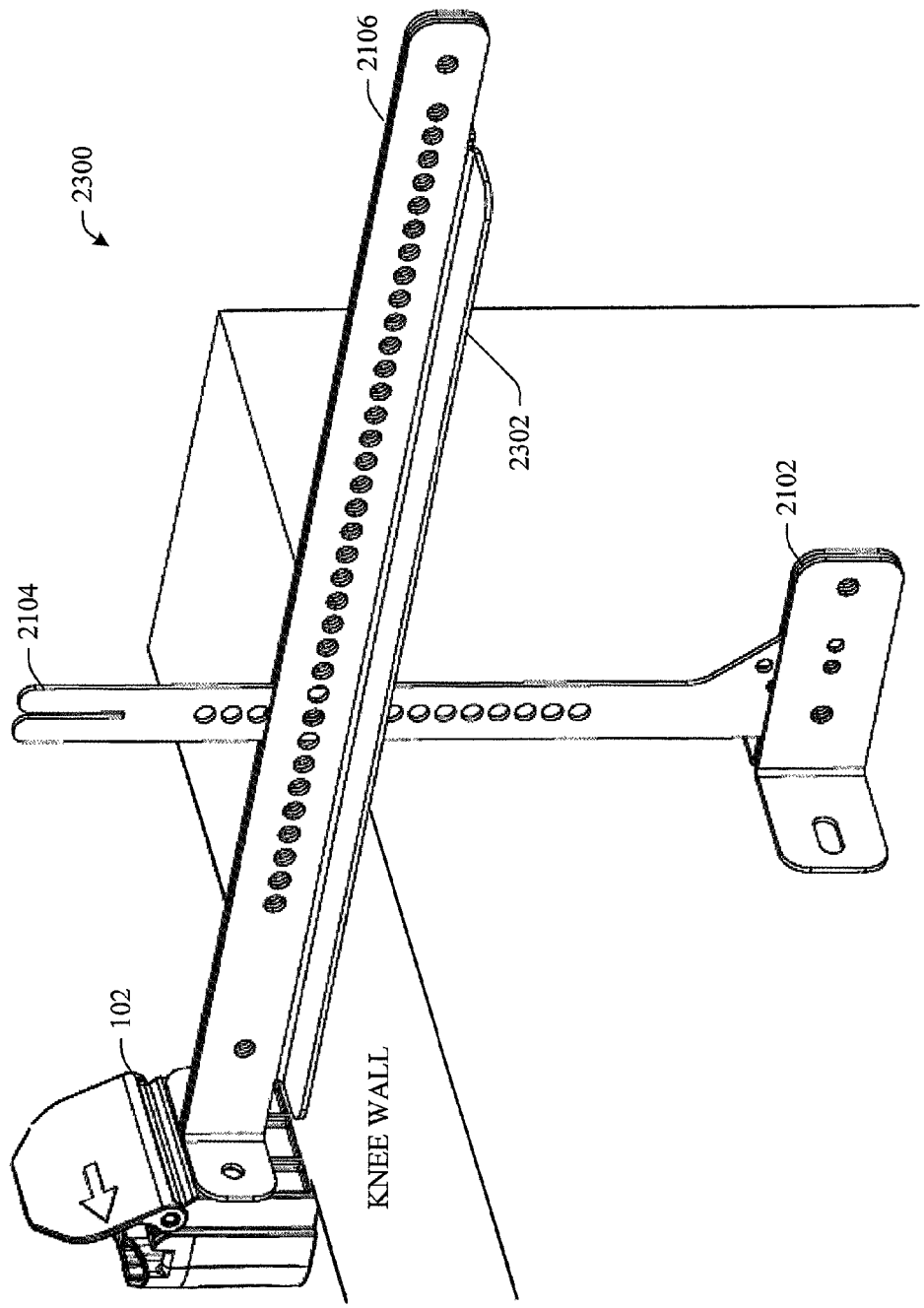
FIG. 23 illustrates an example mounting bracket assembly configured upon a wall in accordance with aspects of the innovation.

Turning now to FIG. 23, an example installed mounting assembly 2300 is shown mounted atop a knee wall. As shown, the mounting bracket 2102 can be mounted onto the inner side of the knee wall. The connector arm 2104 can be "sandwiched" between (or mounted upon a face of) the mounting bracket 2102. The alignment holes 2108, 2110, as described supra, can be employed to attach the connector arm 2104 to the mounting bracket 2102. Similarly, alignment holes 2112, 2114 can be employed to connect the mounting arm 2106 to the connector arm 2104.

In operation, the connector arm 2104 can be parallel (or substantially parallel) to the inner wall of the knee wall. In a flat-top knee wall arrangement, the mounting arm 2106 can be configured in a perpendicular configuration as shown in FIG. 23. It will be understood and appreciated that the adjustment holes enhance the versatility of the mounting assembly 2300 such that most any wall thickness, top angle, wall angle, etc. can be accommodated. As illustrated, the mounting arm 2106 can be positioned such that the hoist apparatus 102 is mounted just outside the outer face of the knee wall. Still further, to enhance stability, the connector arm 2106 can be equipped with flanges 2302 that rest atop the knee wall when installed.

Figure 24:
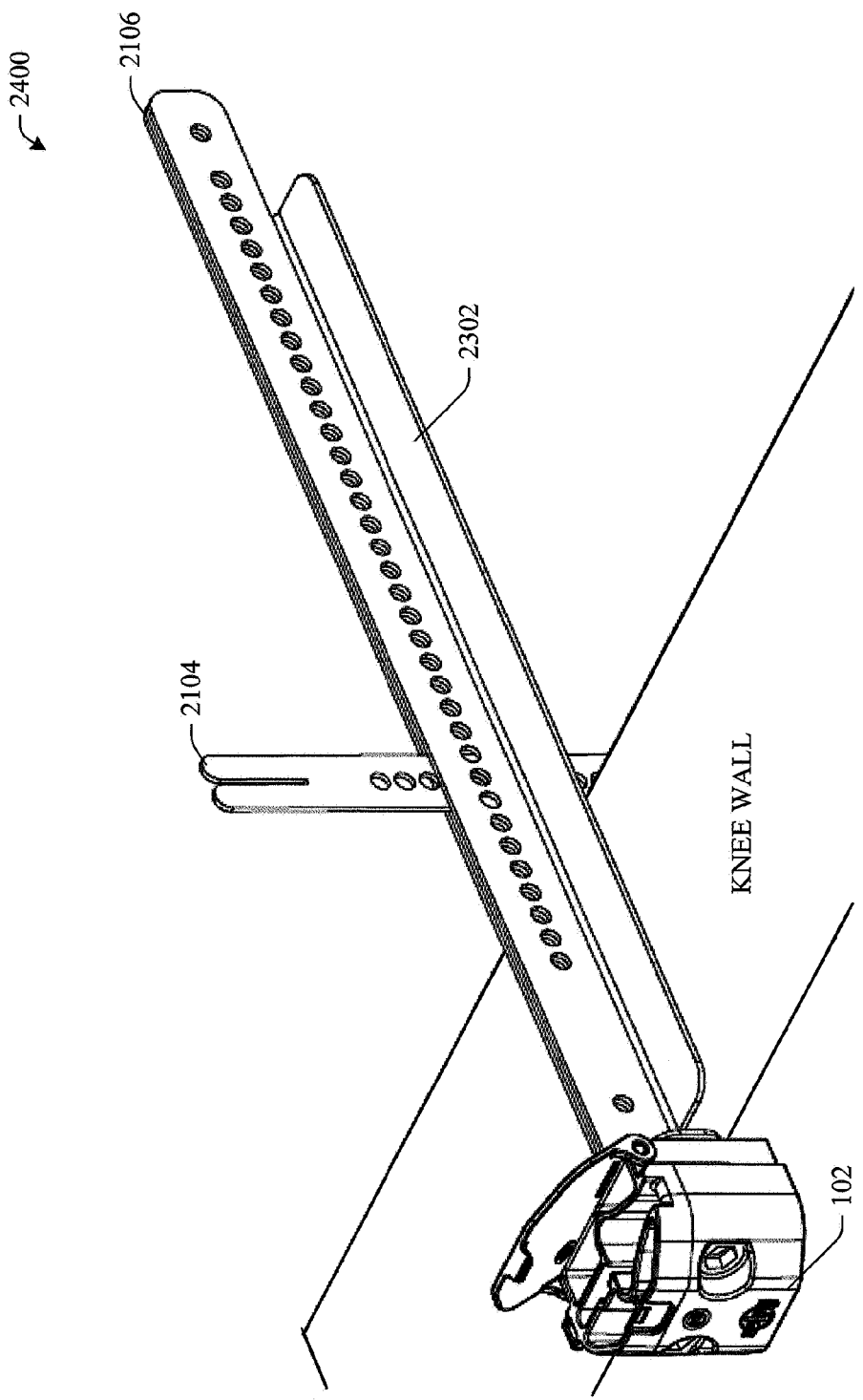
FIG. 24 illustrates an example mounting bracket assembly configured upon a wall in accordance with aspects of the innovation.

FIG. 24 illustrates a perspective view of a hoist apparatus mounting assembly 2400 in accordance with an aspect of the innovation. As shown, connector arm 2106 can be rest atop a knee wall thereby positioning a hoist apparatus 102 on the other side of the wall. It is to be understood that the components of the mounting bracket assemblies described herein (e.g., 2102, 2104, 2106) can be manufactured of steel, aluminum, alloy, plastic, composite or the like. Essentially, most any suitably rigid material can be employed in manufacture of the bracket components.

Figure 25:
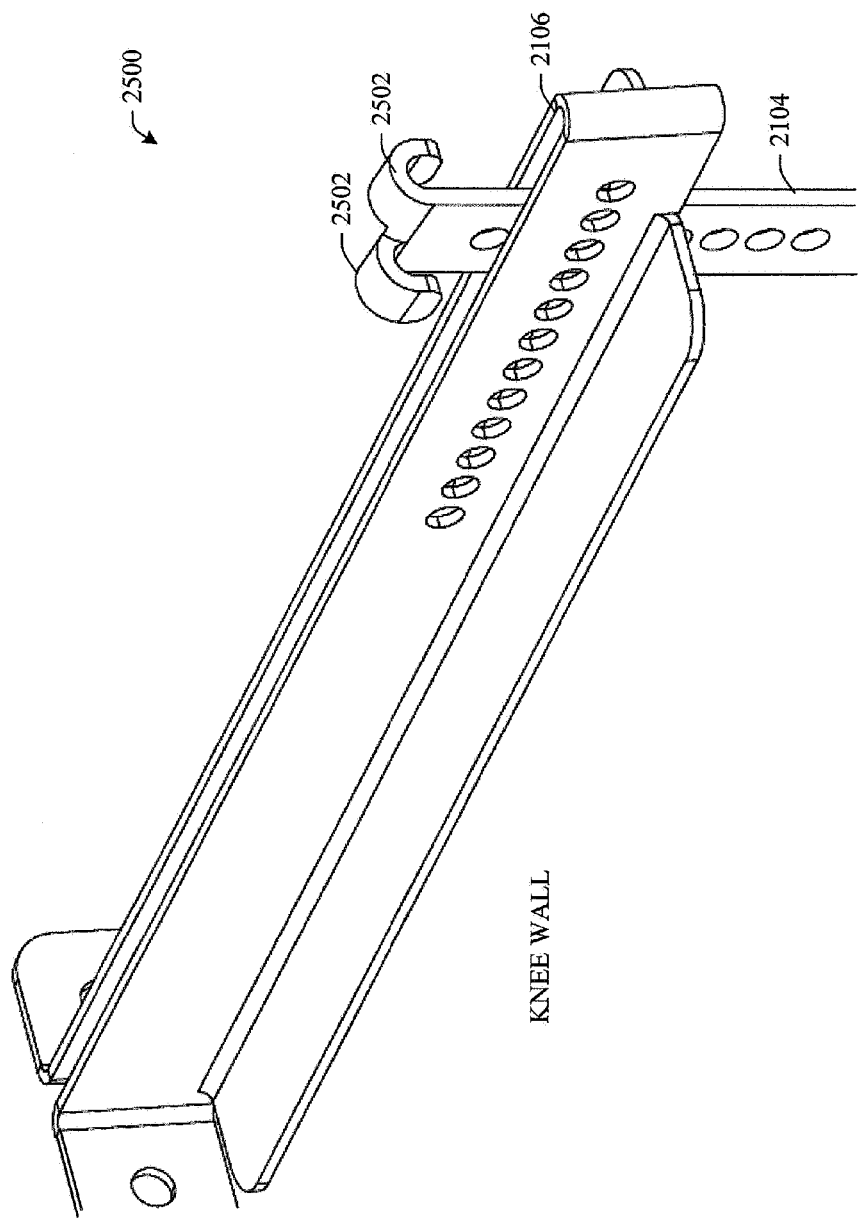
FIG. 25 illustrates an example safety mechanism in accordance with aspects of the innovation.

FIG. 25 illustrates an installation or safety mechanism of connector arm 2104 in accordance with aspects. As shown, once the connector arm 2104 is inserted between the halves of mounting arm 2106, the top tab(s) 2502 can be bent or rolled as shown. As will be understood, once bent, the hook-like tab(s) 2502 can prevent the connector arm 2104 from falling or slipping through the mounting arm, e.g., if inadvertently let go atop a knee wall. It will be appreciated that this feature will not only assist in case of a potential accident scenario, the tabs 2502 can also assist in installation. For example, an installer can allow the arms (2104, 2106) to hang freely when aligning the adjustment holes.

Figure 26:
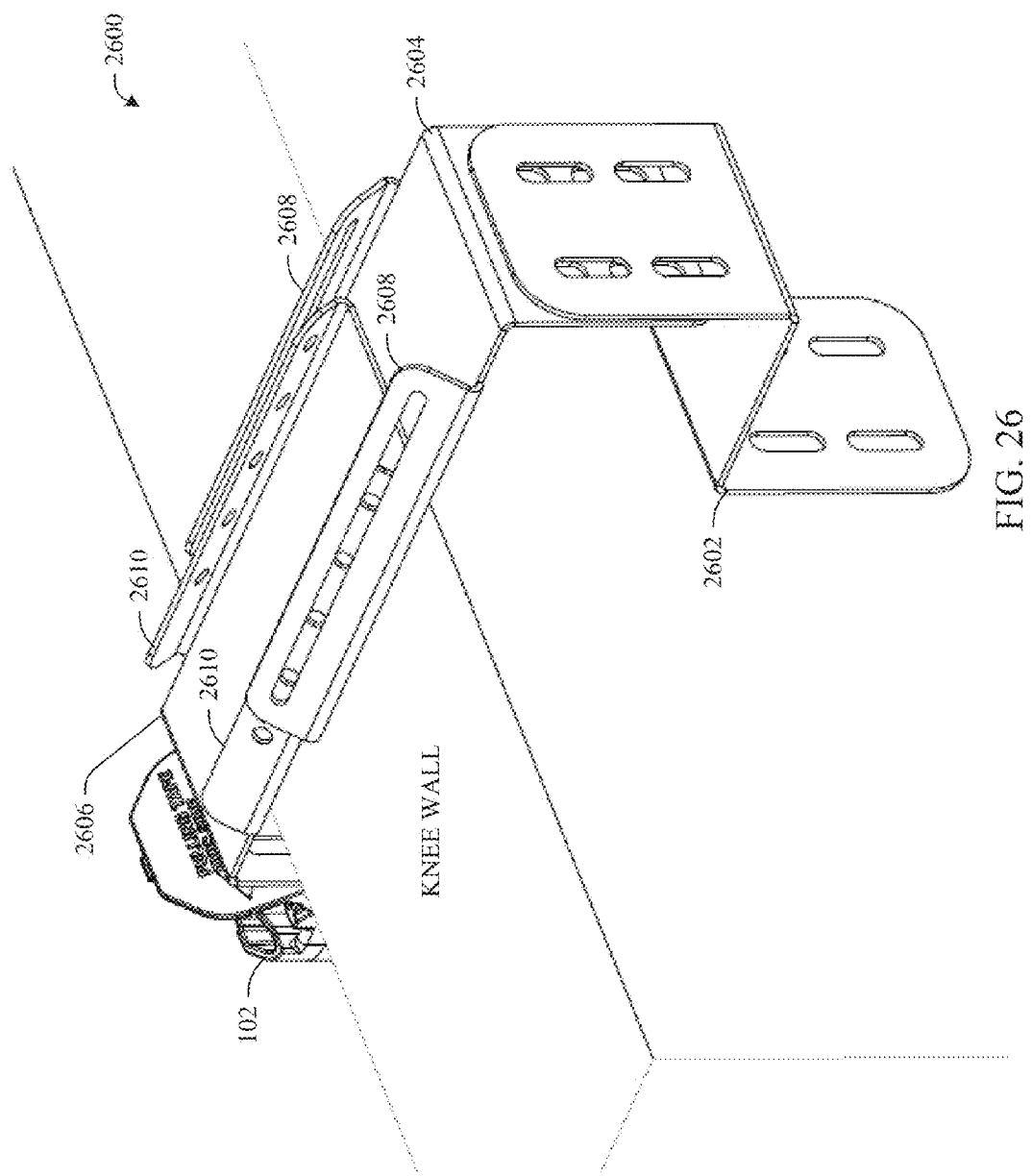
FIG. 26 illustrates an alternative mounting bracket assembly in accordance with aspects of the innovation.

Referring now to FIG. 26, an alternative bracket assembly 2600 is shown. In general, the bracket assembly 2600 can include a mounting bracket 2602, a connector arm 2604 and a mounting arm 2606. As illustrated, a hoist apparatus 102 can be mounted onto the exterior of a knee wall (or other surface).

The mounting bracket 2602 can be equipped with holes, e.g., elongated, round, etc. which facilitate hardware attachment. The mounting bracket 2602 can be installed upon an interior of a knee wall in aspects. As shown, the mounting bracket 2602 can include two vertical faces connected by a horizontal step-like face. The overall step-like shape of the bracket 2602 can enhance versatility thereby enabling installation upon a variety of shapes and sizes of knee walls.

A connector arm 2604 can be attached to the mounting bracket 2602 via adjuster apertures as shown. A mounting arm 2606 can be slidably attached to the connector arm 2604 such that a hoist apparatus 102 can be attached to the outward facing end of the mounting arm 2606. The connector arm 2604 can be equipped with a connector dove-tail 2608 that slidably mates with a mounting arm dove-tail 2610. Each of the dove tails (2608, 2610) can be equipped with adjustment holes and/or slots as shown that facilitate variable adjustment to accommodate variable widths of knee walls.

Figure 27:
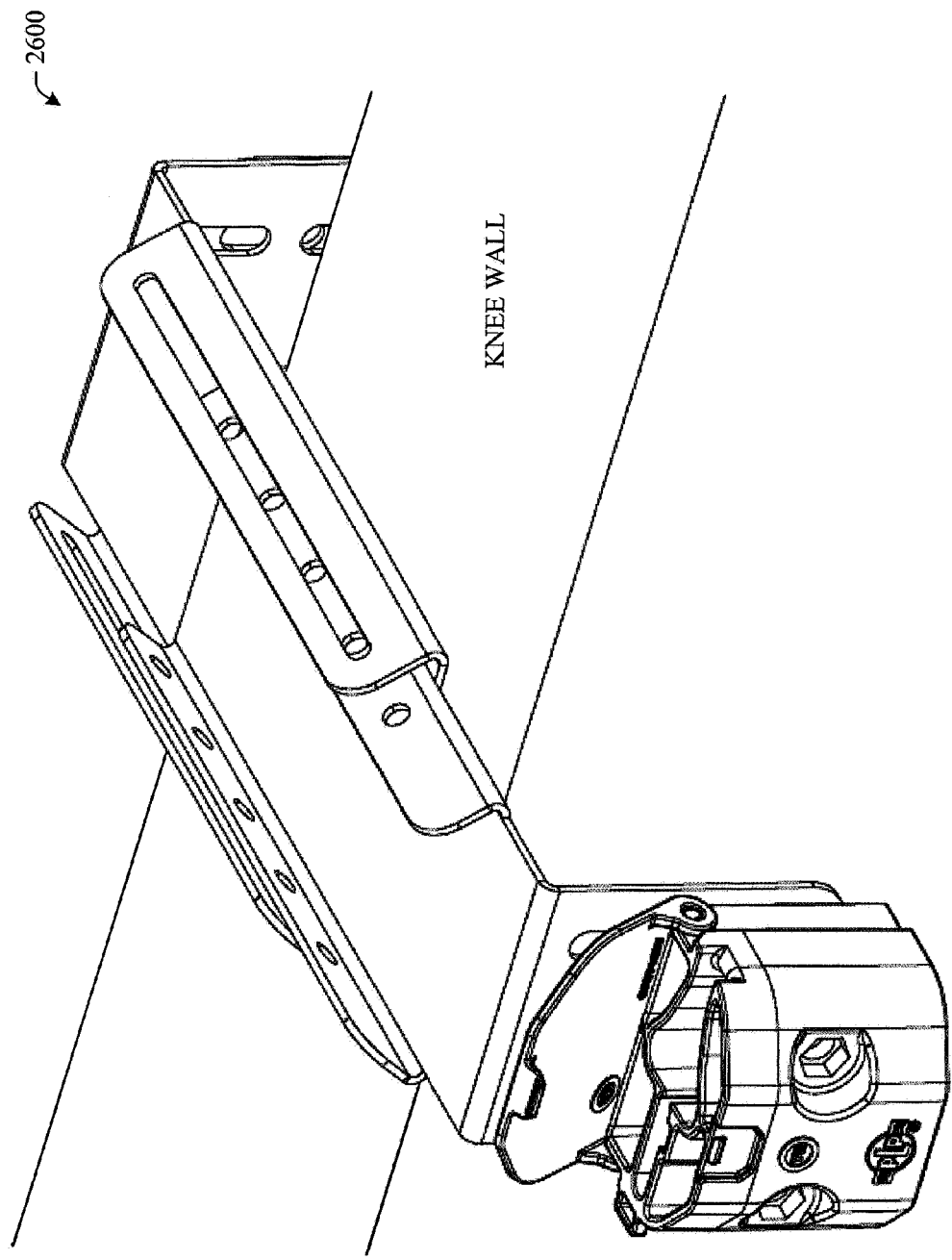
FIG. 27 illustrates an alternative view of a slidably adjustable mounting bracket assembly in accordance with aspects of the innovation.

FIG. 27 illustrates a perspective view of mounting assembly 2600 from the outer side of a knee wall. As will be understood, once the mounting bracket assembly 2600 is installed atop a knee wall, a pulling tape can be threaded into the hoist assembly (through a pulley assembly) and dropped or lowered to ground level. Thus, a fiber optic installer can install cabling from ground level by attaching to the pulling tape and hoisting to apparatus level. Similar to the tabs described in FIG. 25, it is to be understood that the dove-tails can provide a security feature that enhances and assists in installation of the bracket assembly 2600.

Figure 28:
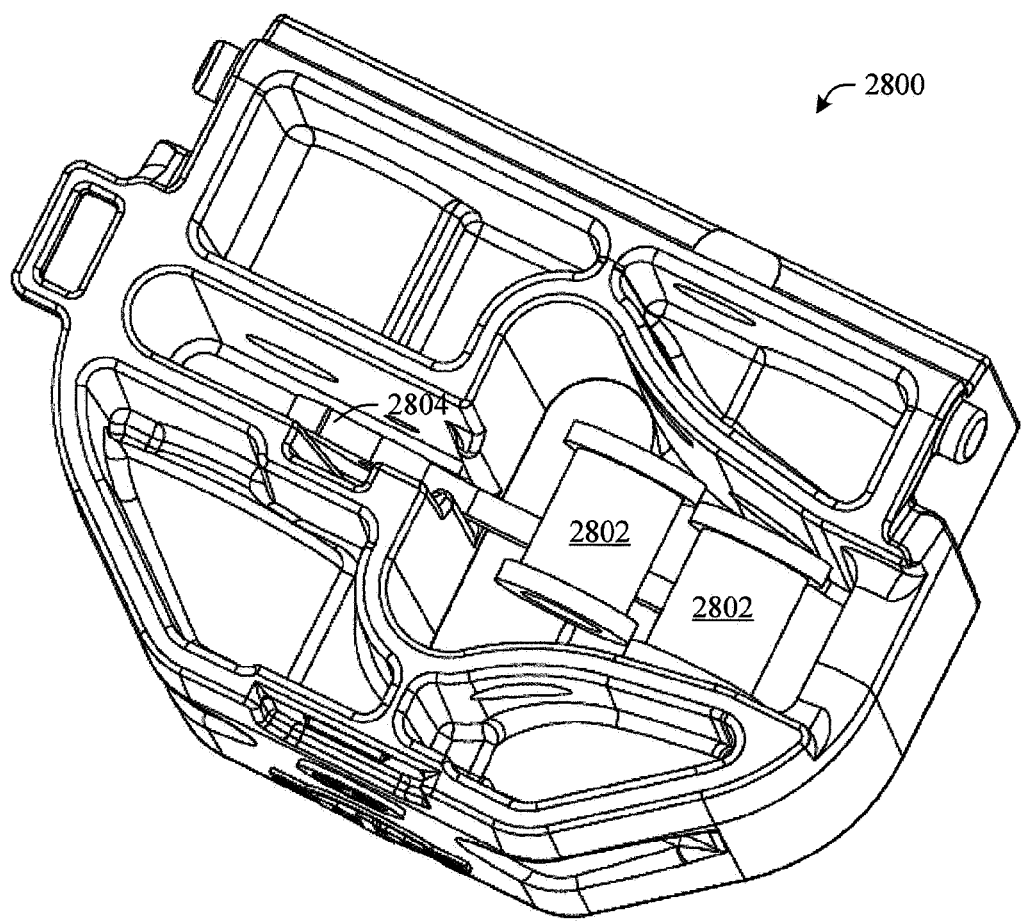
FIG. 28 illustrates an example top view of a hoist mechanism in accordance with aspects of the innovation.

Turning now to FIG. 28, a top perspective view of an alternative hoist apparatus 2800 is shown. As illustrated, while having similar functionality as hoist apparatus 102 of FIG. 1, the hoist apparatus 2800 is equipped with a plurality (e.g., 3) of pulleys 2802 that assist in alignment and force reduction. The pulling tape can be threaded between the pulleys 2802 and out of the apparatus 2800. Additionally, as will be described in greater detail infra, the apparatus 2800 can be equipped with a retention region 2804 that holds or secures one end of a pulling tape. The end of the pulling tape that is held within the retention region 2804 can be equipped with a knot that wedges against the sidewalls of the retention region 2804. Once retained, a loop can be lowered to ground level along with the other end of the pulling tape as shown in FIGS. 1 and 2.

Figure 29:
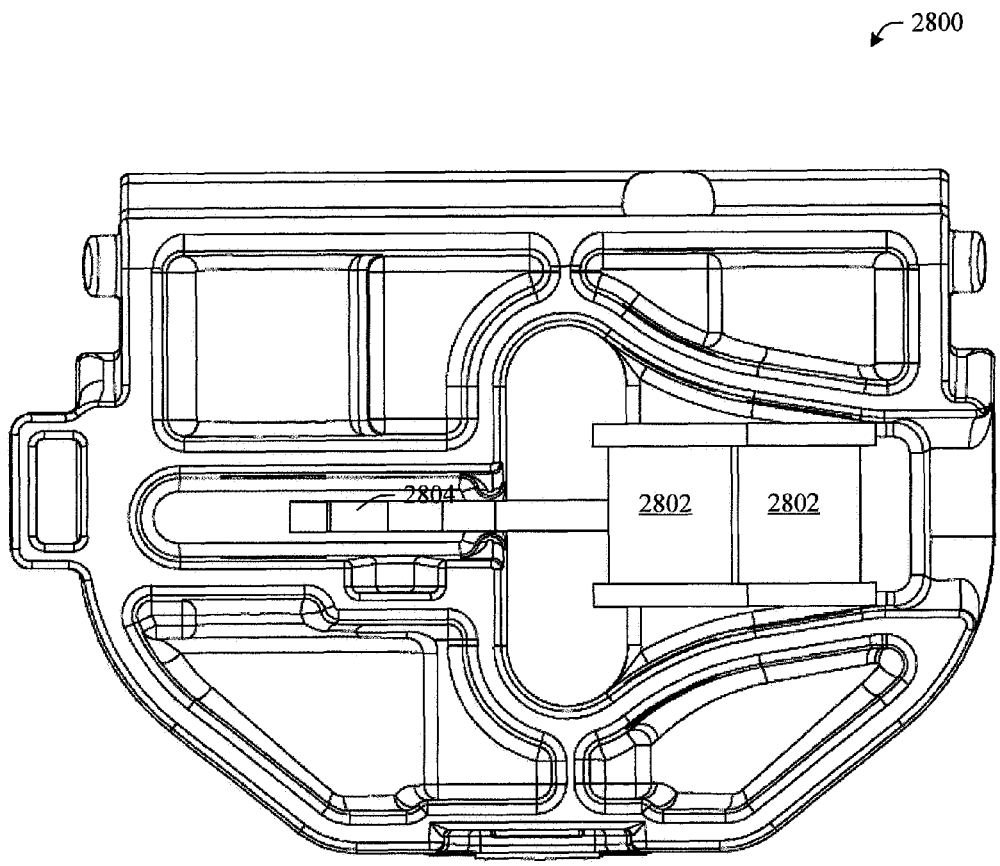
FIG. 29 illustrates an alternative example top view of a hoist mechanism in accordance with aspects of the innovation.

FIG. 29 illustrates a top-down perspective view of hoist apparatus 2800. As shown, the apparatus 2800 can include a series of pulleys 2802 through which a pulling tape can be threaded. In operation, a knot can be tied in one end of the pulling tape which can be secured within the retention region 2804. A loop of pulling tape can be dropped through the apparatus 2800 and down to ground level. The other end of the pulling tape can be threaded through the pulleys 2802, out the side of the apparatus and down to ground level, as shown in FIGS. 1 and 2.

Figure 30:
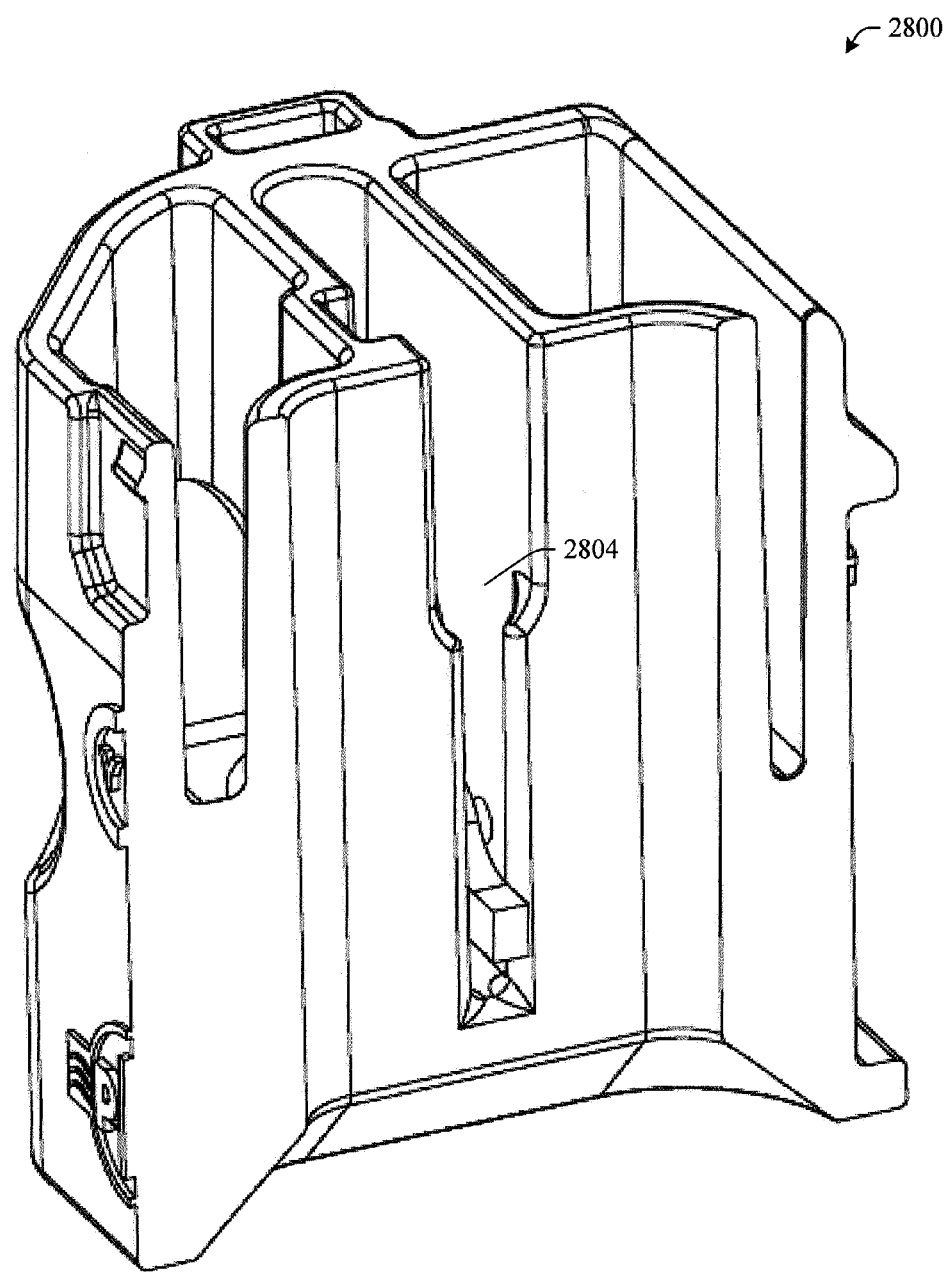
FIG. 30 illustrates a cross-sectional view of an example hoist mechanism in accordance with the innovation.

The retention region 2804 is shown in FIG. 30. As will be understood, a knot (or other obstructive device/treatment) of a pulling tape can be positioned and mechanically held within the retention region 2804. Once a dead-end or tether enters the apparatus 2800 and locks, tension upon the pulling tape, together with a specific angle of insertion, can release the tape allowing it to be easily pulled through the tether or dead-end and ultimately to ground level.

Figure 31:
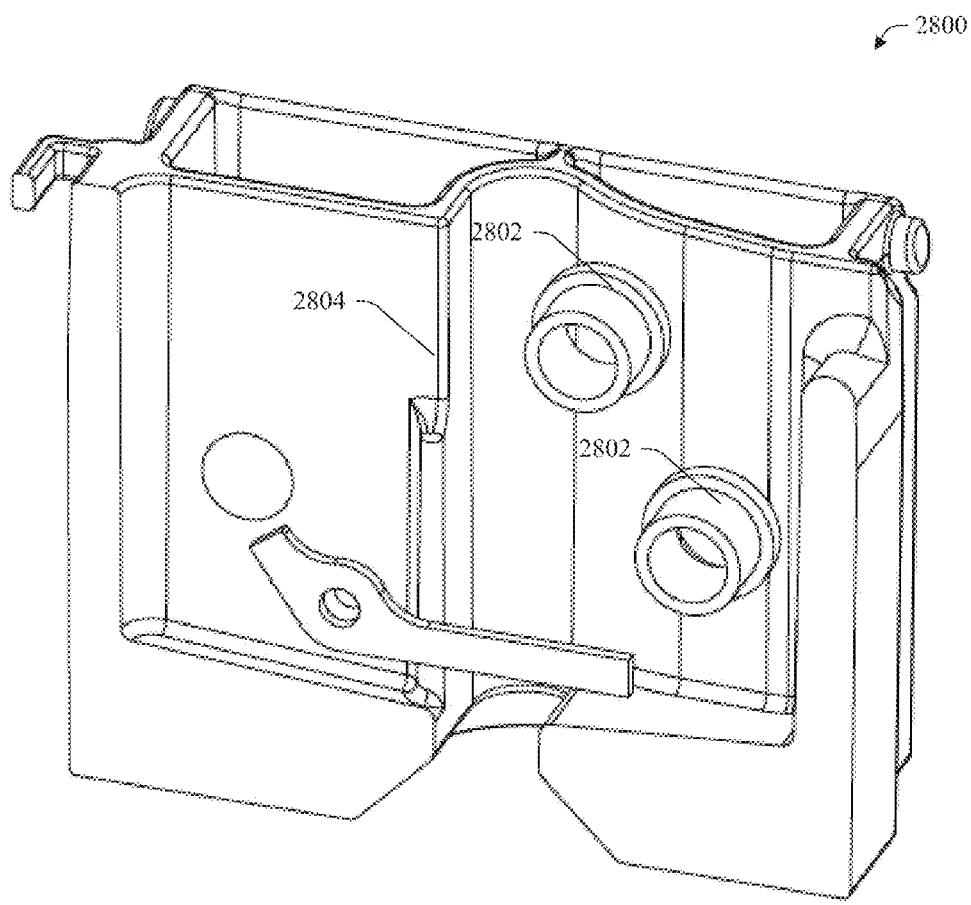
FIG. 31 illustrates an alternative cross-sectional view of an example hoist mechanism in accordance with the innovation.

FIG. 31 illustrates an example cross-sectional view of the apparatus 2800 in accordance with aspects of the innovation. As shown, pulleys 2802 can be provided to route a pulling tape through the apparatus 2800. Additionally, as described above, the retention region 2804 can be employed to secure one end a pulling tape (e.g., knotted).

Figure 32:
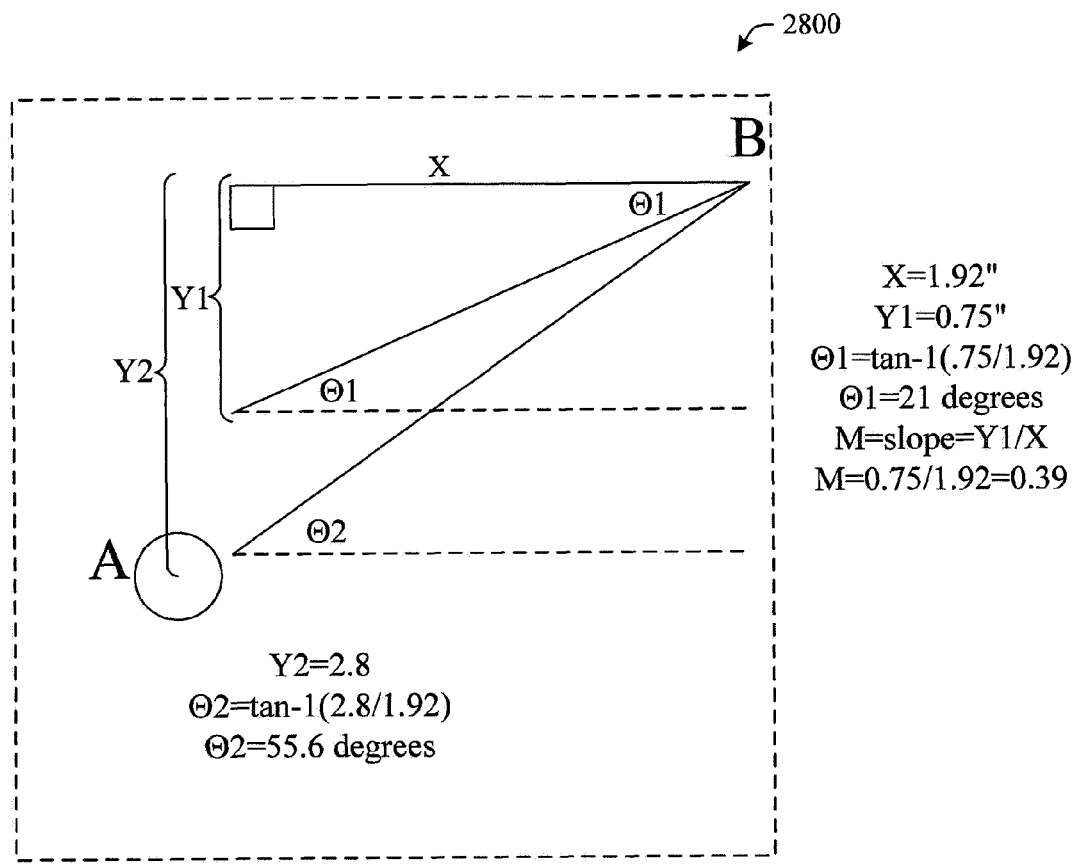
FIG. 32 illustrates example calculations of a sufficient pulling tape angle in accordance with aspects of the innovation.

FIG. 32 illustrates an example calculation of a release angle in accordance with aspects of the innovation. As described herein, a particular angle from the knotted (or treated) end of the pulling tape (A) to the exit (B) of the apparatus 2800 creates a change in direction of the force vector which facilitates a release from within the retention area once the dead-end or similar device is engaged.

As illustrated, in one particular example, with X=1.92" and $Y_1$=0.75", $\theta_1$=tan(0.75/1.92) or $\theta_1$=21°. Additionally, m=slope which is Y/X=0.75/1.92 or 0.39. Still further, with $Y_2$=2.8", $\theta_2$=tan(2.8/1.92) or $\theta_2$=55.6°. It is to be understood and appreciated that this calculation is based upon a specific geometric design of a hoist apparatus 2800. In other words, as a dimension(s) changes, the angles will in turn change to accommodate varied the dimension(s). However, the underlying methodology (calculation) can be employed with revised values of X and Y.

Figure 33:
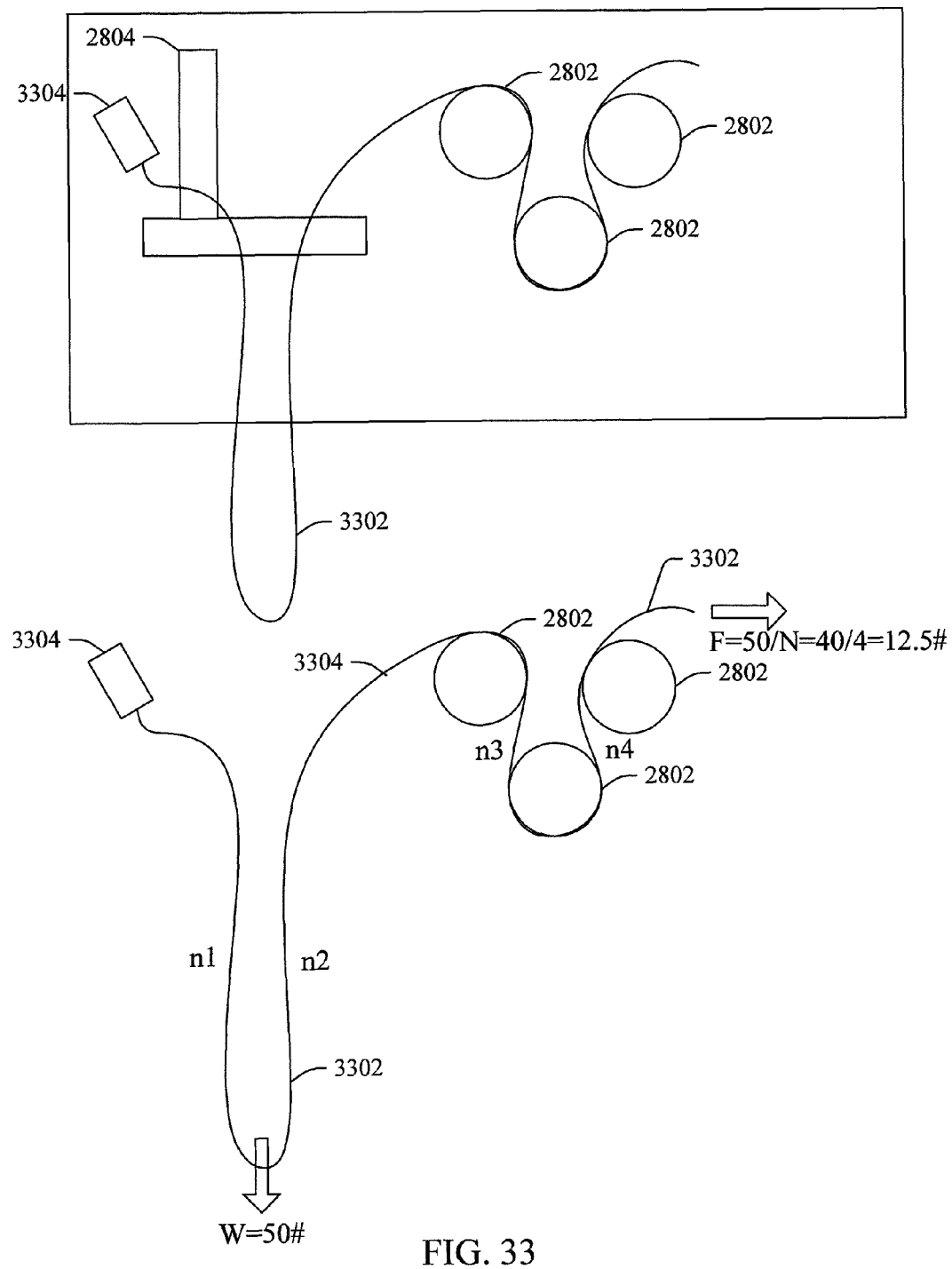
FIG. 33 illustrates an example pulling tape path through a hoist mechanism in accordance with aspects of the innovation.

As shown in FIG. 33, a pulling tape 3302 can be threaded through a series of pulleys 2802 as shown. The retention region 2804 can retain a knotted end 3304 of the tape 3302. FIG. 33 (bottom) illustrates an advantage to the force calculation of the pulley system of the embodiment. More particularly, the pulling tape is separated into segments $n_1$, $n_2$, $n_3$ and $n_4$ as shown. It is to be understood that, while three (3) pulleys are illustrated in FIG. 33, the last or rightmost pulley can be illustrative of the exit portion of hoist housing (e.g., as illustrated in FIG. 5 by the right-angled dashed arrow). Other aspects can include three (or more) pulleys by design.

At the looped section (e.g., 108 of FIG. 1), the weight (W)=50 pounds (#), e.g., of the cable and loop assembly. Accordingly, the force (F) at the hoisting end of the pulling tape can be calculated as F=50/n or 50/4. Thus the force that is needed to be applied by a worker in this example is 12.5 pounds (#). It will be appreciated that the pulley mechanism enhances functionality and eases force needed by a worker to hoist a 50# fiber optic loop assembly as illustrated in FIG. 3.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates elevation of a cable, comprising:
a housing having a first cavity that houses a plurality of pulleys configured to receive a pulling device and a second cavity that retains an obstruction treatment on a first end of the pulling device, wherein the first cavity permits ground level removal of the pulling device; and
a locking mechanism disposed within the second cavity that engages a dead-end device attached to a second end of the pulling device thereby facilitating termination of the dead-end device at an elevated level, the dead-end device being attached to the cable; and
a removable obstruction clamp that attaches to a top of the dead-end device, the obstruction clamp having a pair of legs that prohibits the dead-end device from accessing the first cavity,
wherein an exit angle of the pulling device in relation to the obstruction treatment facilitates release of the obstruction treatment from the second cavity and removal of the pulling device.

2. The system of claim 1, wherein the exit angle is approximately 56° relative to a horizontal plane.

3. The system of claim 1, wherein the cable is a strength member having a plurality of fiber optic loops disposed along a length of the strength member.

4. The system of claim 1, wherein the locking mechanism is a free-floating locking pin.

5. The system of claim 4, wherein the locking pin is one of a metal or plastic pin.

6. The system of claim 4, wherein the pin is configured in shape of a loop having two legs that prohibits either end to pivot in excess of 90 degrees.

7. The system of claim 1, wherein the pulling device is one of a pulling tape or rope.

8. The system of claim 1, further comprising an attachment means that positions the housing at the elevated level.

9. The system of claim 8, wherein the attachment means is a bracket assembly having a mounting bracket, a connector arm and a mounting arm that retain the housing upon a surface.

10. The system of claim 9, wherein the mounting bracket attaches to the surface and includes a plurality of attachment holes, wherein the connector arm connects via a subset of the attachment holes on the mounting bracket.

11. The system of claim 10, wherein the connector arm includes a plurality of attachment holes, wherein the mounting arm connects via a subset of the attachment holes on the connector arm.

12. The system of claim 11, wherein each of the connector arm and the mounting arm includes a mating dove-tail that facilitates slidable connection of the connector arm and the mounting arm.

13. The system of claim 1, wherein the obstruction clamp facilitates measurement of a length of the cable to the elevated level.

14. The system of claim 13, wherein each of the pair of legs is configured to snap-off or be snipped off in order to permit engagement of the locking mechanism.

15. A cable hoist apparatus comprising:
a housing having a locking cavity that houses a plurality of pulleys configured to receive a pulling device and a retention region adjacent to the locking cavity, the retention region having side walls that retain a knot on a first end of the pulling device, wherein the locking cavity permits ground level removal of the pulling device; and
a locking mechanism disposed within the retention region that engages a tether attached to a second end of the pulling device thereby facilitating termination of the tether at an elevated level, the tether being attached to the cable;
a removable obstruction clamp attached to the tether, the obstruction clamp having a pair of legs, wherein the pair of legs prohibits the tether from entering the locking cavity; and
an attachment means that positions the housing at the elevated level.

16. The cable hoist apparatus of claim 15, wherein the attachment means includes a mounting bracket attached to a structure, a connector arm attached to the mounting bracket, and a mounting arm attached to the connector arm and to the housing.

17. The cable hoist apparatus of claim 16, wherein the connector arm and the mounting arm each include a mating dove-tail that facilitates a slidable connection of the connector arm and the mounting arm.

18. The cable hoist apparatus of claim 16, wherein the mounting arm includes two halves such that the connector arm resides between the two halves of the mounting arm and wherein the connector arm includes at least one hook-type tab that engages at least one halve of the mounting arm in the event that the connector arm slips through the mounting arm.

19. The cable hoist apparatus of claim 1, wherein the pair of legs is configured to fold when a predetermined amount of force is applied to permit entry into the first cavity thereby allowing the dead-end device to engage the locking mechanism.

* * * * *